(12) United States Patent
Lee et al.

(10) Patent No.: US 10,368,098 B2
(45) Date of Patent: Jul. 30, 2019

(54) METHOD AND DEVICE FOR TRANSMITTING PREDICTION MODE OF DEPTH IMAGE FOR INTERLAYER VIDEO ENCODING AND DECODING

(71) Applicant: SAMSUNG ELECTRONICS CO., LTD., Suwon-si (KR)

(72) Inventors: Jin-young Lee, Suwon-si (KR); Min-woo Park, Yongin-si (KR); Yong-jin Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 310 days.

(21) Appl. No.: 15/320,538

(22) PCT Filed: Jun. 22, 2015

(86) PCT No.: PCT/KR2015/006283
§ 371 (c)(1),
(2) Date: Dec. 20, 2016

(87) PCT Pub. No.: WO2015/194915
PCT Pub. Date: Dec. 23, 2015

(65) Prior Publication Data
US 2017/0251224 A1     Aug. 31, 2017

Related U.S. Application Data

(60) Provisional application No. 62/014,811, filed on Jun. 20, 2014.

(51) Int. Cl.
*H04N 19/597* (2014.01)
*H04N 19/176* (2014.01)
(Continued)

(52) U.S. Cl.
CPC ......... *H04N 19/597* (2014.11); *H04N 19/176* (2014.11); *H04N 19/187* (2014.11);
(Continued)

(58) Field of Classification Search
CPC .................................................. H04N 19/597
See application file for complete search history.

(56) References Cited

U.S. PATENT DOCUMENTS 9,363,535 B2   6/2016  Chen et al.
9,485,521 B2   11/2016  Lim et al.
(Continued)

FOREIGN PATENT DOCUMENTS

CN   101945288 A   1/2011
CN   102857763 A   1/2013
(Continued)

OTHER PUBLICATIONS

International Search Report and Written Opinion dated Sep. 25, 2015, issued by the International Searching Authority in counterpart International Application No. PCT/KR2015/006283 (PCT/ISA/220, 210 & 237).
(Continued)

*Primary Examiner* — Rowina J Cattungal
(74) *Attorney, Agent, or Firm* — Sughrue Mion, PLLC

(57) ABSTRACT

Provided is an interlayer video decoding method according to an embodiment including obtaining prediction-mode information of a current block of a depth image from a bitstream, generating a prediction block of the current block on the basis of the prediction-mode information, and decoding the depth image by using the prediction block. The obtaining of the prediction-mode information of the current block from the bitstream includes receiving a first flag, a second flag, and a third flag, wherein the first flag indicates whether prediction of the current block by dividing the
(Continued)

current block into two or more partitions according to a pattern is permitted, the second flag indicates whether the depth image permits blocks of the depth image to be predicted by dividing the blocks into two or more partitions by using a wedgelet, and the third flag indicates whether the depth image permits the blocks of the depth image to be predicted by dividing the blocks into two or more partitions by using a contour; and receiving a fourth flag from the bitstream when predetermined conditions determined on the basis of the first to third flags are satisfied, wherein the fourth flag represents information regarding a type of a method of dividing the current block into two or more partitions according to the pattern.

8 Claims, 27 Drawing Sheets

(51) Int. Cl.
  *H04N 19/70* (2014.01)
  *H04N 19/187* (2014.01)
  *H04N 19/503* (2014.01)
  *H04N 19/107* (2014.01)
(52) U.S. Cl.
  CPC .......... *H04N 19/503* (2014.11); *H04N 19/70* (2014.11); *H04N 19/107* (2014.11)

(56) References Cited

U.S. PATENT DOCUMENTS

| | | | |
|---|---|---|---|
| 9,883,191 B2 | 1/2018 | Lee et al. | |
| 10,034,021 B2 | 7/2018 | Zheng | |
| 10,110,903 B2 | 10/2018 | Wiegand et al. | |
| 2013/0243088 A1 | 9/2013 | Lim et al. | |
| 2014/0334542 A1 | 11/2014 | Lee et al. | |
| 2015/0098508 A1 | 4/2015 | Yie et al. | |
| 2015/0172717 A1* | 6/2015 | Zhao | H04N 19/597 375/240.16 |
| 2016/0094848 A1 | 3/2016 | Kim et al. | |
| 2016/0212446 A1* | 7/2016 | Liu | H04N 19/597 |

FOREIGN PATENT DOCUMENTS

| | | |
|---|---|---|
| CN | 103067716 A | 4/2013 |
| CN | 103155558 A | 6/2013 |
| CN | 103237214 A | 8/2013 |
| CN | 104010196 A | 8/2014 |
| KR | 1020120068743 A | 6/2012 |
| KR | 1020130047650 A | 5/2013 |
| KR | 1020130079261 A | 7/2013 |
| KR | 101350597 B1 | 1/2014 |
| KR | 1020140043243 A | 4/2014 |
| WO | 2013016004 A1 | 1/2013 |
| WO | 2013042884 A1 | 3/2013 |
| WO | 2013062389 A1 | 5/2013 |
| WO | 2013068564 A1 | 5/2013 |
| WO | 2013068566 A1 | 5/2013 |
| WO | 2013068567 A1 | 5/2013 |
| WO | 2013100635 A1 | 7/2013 |

OTHER PUBLICATIONS

Communication dated Mar. 1, 2019, issued by the State Intellectual Property Office of P.R. China in counterpart Chinese Application No. 2201580033274.3.
Communication dated May 14, 2019 issued by the Japanese Patent Office in counterpart Japanese Application No. 2016-573764.
Deshpande, S., "On Indications for Inter-layer Prediction", Joint Collaborative Team on 3D Video Coding Extensions of ITU-T SG 16 WP 3 and ISO/IEC JTC 1/SC 29/WG 11, 7th Meeting, 2014, Document JCTVC-P0157, Document JCT3V-G0146, pp. 1-6 (6 pages total).
Tech, G., "3D-HEVC Draft Text 7", Joint Collaborative Team on 3D Video Coding Extensions of ITU-T SG 16 WP 3 and ISO/IEC JTC 1/SC 29/WG 11, 11th Meeting, 2015, Document JCT3V-K1001-v9, pp. 1-10, (10 pages total).
Lee et al., "3D-CE2 related: Separate enabling flag for intra coding tools", Joint Collaborative Team on 3D Video Coding Extensions of ITU-T SG 16 WP 3 and ISO/IEC JTC 1/SC 29/WG 11, 9th Meeting, 2014, Document JCT3V-I0085, pp. 1-7, (7 pages total).
Tech, G., "3D-HEVC Draft Text 4", Joint Collaborative Team on 3D Video Coding Extensions of ITU-T SG 16 WP 3 and ISO/IEC JTC 1/SC 29/WG 11, 8th Meeting, May 18, 2014, JCT3V-H1001-v2, pp. 1-8 (8 pages total).

\* cited by examiner

FIG. 4A

| sps_3d_extension( ) { | Descriptor |
|---|---|
|   for( d = 0; d <= 1; d++ ) { | |
|     iv_di_mc_enabled_flag[ d ] | u(1) |
|     iv_mv_scal_enabled_flag[ d ] | u(1) |
|     if( d == 0 ) { | |
|       ... | |
|     } else { | |
|       tex_mc_enabled_flag[ d ] | u(1) |
|       log2_texmc_sub_pb_size_minus3[ d ] | ue(v) |
|       intra_contour_enabled_flag[ d ] | u(1) |
|       intra_dc_only_wedge_enabled_flag[ d ] | u(1) |
|       cqt_cu_part_pred_enabled_flag[ d ] | u(1) |
|       inter_dc_only_enabled_flag[ d ] | u(1) |
|       skip_intra_enabled_flag[ d ] | u(1) |
|     } | |
|   } | |
| } | |

410 — intra_contour_enabled_flag[ d ]
420 — intra_dc_only_wedge_enabled_flag[ d ]
430 — inter_dc_only_enabled_flag[ d ]

FIG. 4B
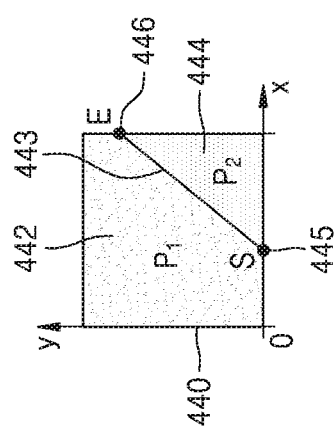
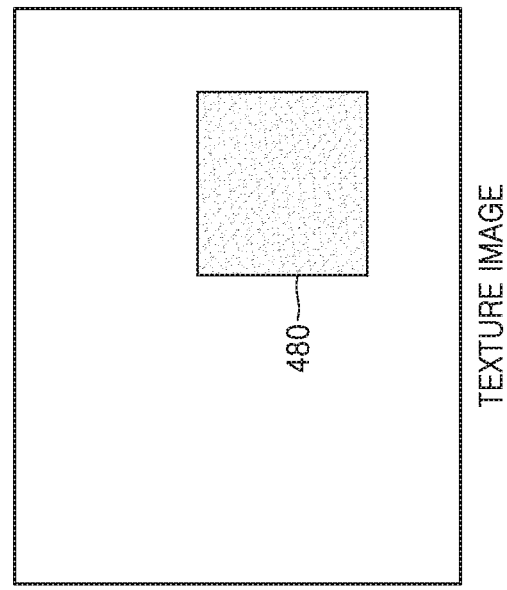
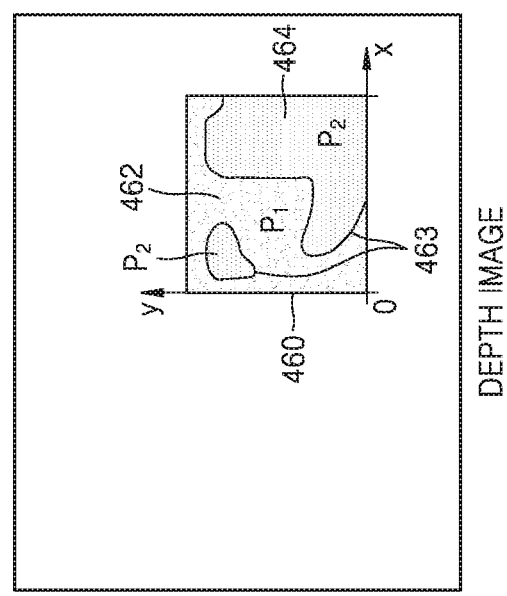

FIG. 5

| coding_unit( x0,y0,log2CbSize ) { | Descriptor |
|---|---|
| ... | ae(v) |
|     if( CuPredMode[ x0 ][ y0] == MODE_INTRA ) { | |
|       ... | |
|     } else { | |
|       pbOffset = ( PartMode == PART_NxN ) ? ( nCbS/ 2 ) : nCbS | |
|       log2PbSize = log2CbSize− ( ( PartMode == PART_NxN ) ? 1 : 0 ) | |
|       for( j = 0; j < nCbS; j = j + pbOffset ) | |
|         for( i = 0; i < nCbS; i = i + pbOffset ) { | |
| 550 —           if( IntraDcOnlyWedgeEnabledFlag \|\| IntraContourEnabledFlag ) | |
|           intra_mode_ext( x0 + i , y0 + j , log2PbSize ) | |
| 570 —         if( no_dim_flag[ x0 + i][ y0 + j ] ) | |
|           prev_intra_luma_pred_flag[ x0 + i ][ y0 + j ] | ae(v) |
|         } | |
|     ... | |
| } | |

FIG. 6

| | Descriptor |
|---|---|
| intra_mode_ext( x0, y0, log2PbSize ) { | |
|   if( log2PbSize < 6 ) | |
|     no_dim_flag[ x0 ][ y0 ] | ae(v) |
|   if( !no_dim_flag[ x0 ][ y0 ] && IntraDcOnlyWedgeEnabledFlag && IntraContourEnabledFlag ) | |
|     depth_intra_mode_idx_flag[ x0 ][ y0 ] | ae(v) |
|   if( !no_dim_flag[ x0 ][ y0 ] && !depth_intra_mode_idx_flag[ x0 ][ y0 ] ) | |
|     wedge_full_tab_idx[ x0 ][ y0 ] | ae(v) |
| } | |

570 — no_dim_flag row
630 — depth_intra_mode_idx_flag row
650 — wedge_full_tab_idx row FIG. 14
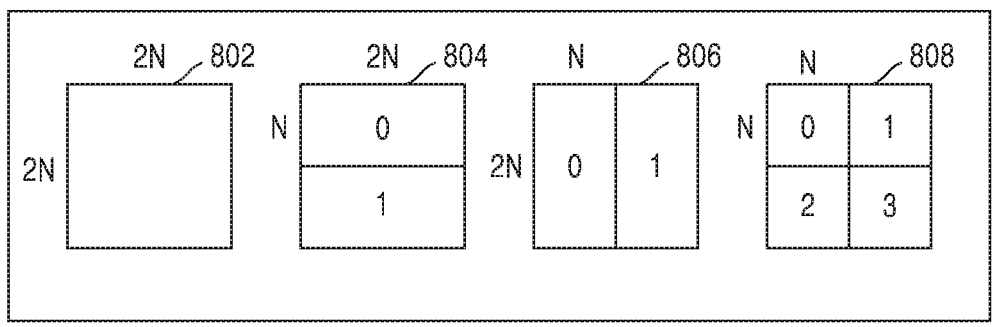
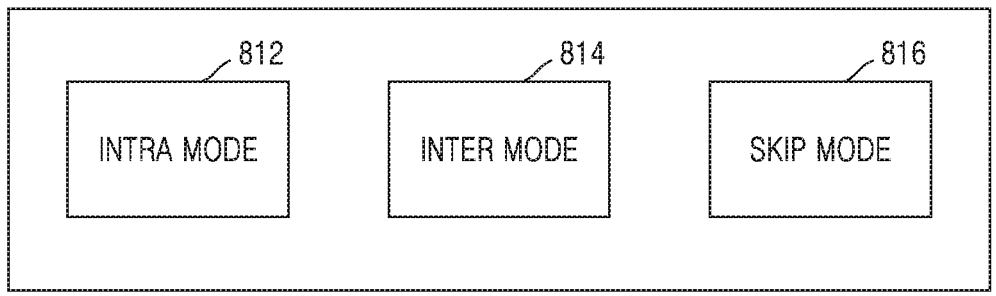
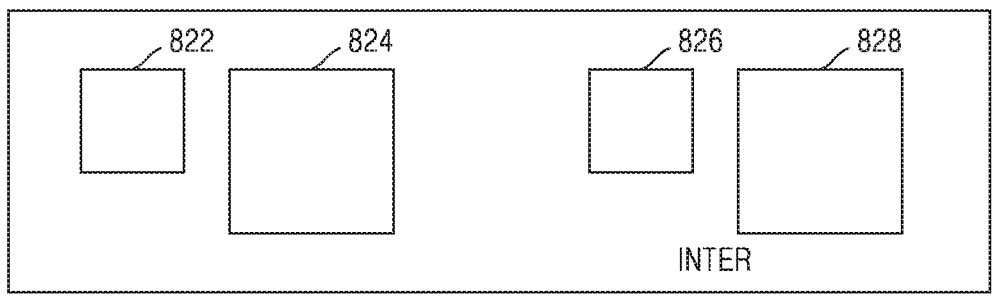

CODING UNIT (1010)

METHOD AND DEVICE FOR TRANSMITTING PREDICTION MODE OF DEPTH IMAGE FOR INTERLAYER VIDEO ENCODING AND DECODING

This application is a National stage entry of International Application No. PCT/KR2015/006283, filed on Jun. 22, 2015, which claims priority from U.S. Provisional Application No. 62/014,811, filed on Jun. 20, 2014 in the United States Patent and Trademark Office. The disclosures of each of the applications are herein incorporated by reference in their entirety.

TECHNICAL FIELD

The present disclosure relates to interlayer video encoding and decoding methods, and more particularly, methods of encoding and decoding a prediction mode of a depth image.

BACKGROUND ART

A stereoscopic image means a three-dimensional (3D) image which provides information regarding a depth and the shape of a space, as well as information regarding an image. A stereo image provides different viewpoint images to left and right eyes. In contrast, the stereoscopic image provides an image viewed in a different direction whenever an observer changes a viewpoint. Thus, images captured from a plurality of viewpoints are needed to generate a stereoscopic image.

The amount of data of images captured from various viewpoints to generate a stereoscopic image is large. Thus, if a network infrastructure, a ground wave bandwidth, etc. are taken into account for the stereoscopic image, the stereoscopic image is almost impossible to achieve although the images are compressed using an encoding apparatus optimized to single-view video coding such as MPEG-2, H.264/AVC, HEVC, etc.

Thus, a multi-view (multi-layer) video encoding apparatus optimized to generate a stereoscopic image is needed. In particular, technology of efficiently reducing redundancy between time and viewpoints is needed.

For example, according to multi-view video codec, an image captured from a basic viewpoint may be compressed through single-view video compression, and encoded by referring to the basic viewpoint when the image is expanded, thereby improving a compression ratio. Furthermore, auxiliary data such as a depth image may be additionally encoded to generate images from more viewpoints than viewpoints input from an image decoding side. Here, the depth image is used to synthesize images from intermediate viewpoints rather than being used to be directly viewed to a user. When the depth image deteriorates, the quality of a synthetic image is low. Thus, in multi-view video codec, not only multi-view video but also a depth image should be efficiently compressed.

DETAILED DESCRIPTION OF THE INVENTION

Advantageous Effects

In an interlayer video decoding and encoding apparatus and method according to an embodiment, a prediction mode of a depth image may be efficiently encoded or decoded to decrease device complexity and efficiently generate an image when images are synthesized.

Technical aspects and effects of the present disclosure are not limited to the above description and other aspects will become apparent and more readily appreciated to those of ordinary skill in the art from the following description.

BRIEF DESCRIPTION OF THE DRAWINGS

FIG. 4A illustrates SPS 3D extension syntax according to an embodiment

FIG. 4B illustrates two types of DMM prediction mode.

FIG. 5 illustrates coding_unit syntax according to an embodiment.

FIG. 6 illustrates intra_mode_ext syntax for receiving DMM parameters.

FIG. 14 illustrates a plurality of pieces of encoding information according to depths, according to an embodiment.

BEST MODE

Figure 1A:
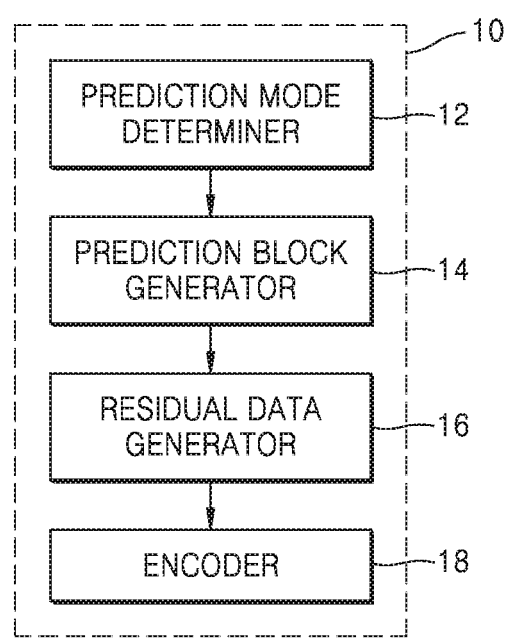
FIG. 1A is a block diagram of an interlayer video encoding apparatus according to an embodiment.

According to one aspect, an interlayer video decoding method includes obtaining prediction-mode information of a current block of a depth image from a bitstream; generating a prediction block of the current block on the basis of the prediction-mode information; and decoding the depth image by using the prediction block. The obtaining of the prediction-mode information of the current block from the bitstream includes receiving a first flag, a second flag, and a third flag, and receiving a fourth flag from the bitstream when predetermined conditions determined on the basis of the first to third flags are satisfied, wherein the first flag indicates whether prediction of the current block by dividing the current block into two or more partitions according to a pattern is permitted, the second flag indicates whether the depth image permits blocks of the depth image to be predicted by dividing the blocks into two or more partitions by using a wedgelet, the third flag indicates whether the depth image permits the blocks of the depth image to be predicted by dividing the blocks into two or more partitions by using a contour, and the fourth flag represents information regarding a type of a method of dividing the current block into two or more partitions according to a pattern.

The second flag may further indicate whether the depth image permits the blocks of the depth image to be predicted using an intra-simplified depth coding (SDC) mode.

The fourth flag may define either a method of predicting the current block by dividing the current block into two or more partitions by using the wedgelet or a method of predicting the current block by dividing the current block into two or more partitions by using the contour.

The third flag may represent that the depth image does not permit a method of predicting the blocks of the depth image by dividing the blocks into two or more partitions by using a contour when the depth image does not permit texture images corresponding to the blocks of the depth image to be referred to.

The obtaining of the prediction-mode information of the current block of the depth image may include determining that the predetermined conditions are satisfied when the first flag indicates that the method of predicting the current block by dividing the current block into two or more partitions according to the pattern is permitted, the second flag indicates that the depth image permits a method of predicting the blocks of the depth image by dividing the blocks into two or more partitions by using the wedgelet, and the third flag indicates that the depth image permits a method of predicting the blocks of the depth image by dividing the blocks into two or more partitions by using the contour.

During the obtaining of the prediction-mode information of the current block of the depth image, the current block may be determined to be predicted by dividing the current block into two or more partitions by using the wedgelet, when the predetermined conditions are not satisfied, the second flag indicates that the depth image permits a method of predicting the blocks of the depth image by dividing the blocks into two or more partitions by using the wedgelet, and the third flag indicates that the depth image does not permit a method of predicting the blocks of the depth image by dividing the blocks into two or more partitions by using the contour; and may be determined to be predicted by dividing the current block into two or more partitions by using the contour, when the predetermined conditions are not satisfied, the second flag indicates that the depth image does not permit the method of predicting the blocks of the depth image by dividing the blocks into two or more partitions by using the wedgelet, and the third flag indicates that the depth image permits the method of predicting the blocks of the depth image by dividing the blocks into two or more partitions by using the contour.

According to another aspect, an interlayer video encoding method includes determining a prediction mode of a current block of a depth image; generating a prediction block of the current block by using the determined prediction mode; and encoding the depth image by using the prediction block to generate a bitstream. The determining of the prediction mode of the current block includes generating a first flag, a second flag, and a third flag, wherein the first flag indicates whether prediction of the current block by dividing the current block into two or more partitions according to a pattern is permitted, the second flag indicates whether the depth image permits blocks of the depth image to be predicted by dividing the blocks into two or more partitions by using a wedgelet, and the third flag indicates whether the depth image permits the blocks of the depth image to be predicted by dividing the blocks into two or more partitions by using a contour; and generating a fourth flag when predetermined conditions determined on the basis of the first flag, the second flag, and the third flag are satisfied, wherein the fourth flag represents information regarding a type of a method of dividing the current block into two or more partitions according to the pattern.

According to another aspect, an interlayer video decoding apparatus includes a prediction mode determiner configured to obtain prediction-mode information of a current block of a depth image from a bitstream; a prediction block generator configured to generate a prediction block of the current block on the basis of the prediction-mode information; and a decoder configured to decode the depth image by using the prediction block. The prediction mode determiner receives a first flag, a second flag, and a third flag, and receives a fourth flag from the bitstream when predetermined conditions determined on the basis of the first to third flags are satisfied, wherein the first flag indicates whether prediction of the current block by dividing the current block into two or more partitions according to a pattern is permitted, the second flag indicates whether the depth image permits blocks of the depth image to be predicted by dividing the blocks into two or more partitions by using a wedgelet, the third flag indicates whether the depth image permits the blocks of the depth image to be predicted by dividing the blocks into two or more partitions by using a contour, and the fourth flag represents information regarding a type of a method of dividing the current block into two or more partitions according to a pattern According to another aspect, an interlayer video encoding apparatus includes a prediction mode determiner configured to determine a prediction mode of a current block of a depth image; prediction block generator configured to generate a prediction block of the current block by using the determined prediction mode; and an encoder configured to encode the depth image by using the prediction block to generate a bitstream. The prediction mode determiner generates a first flag, a second flag, and a third flag, and generates a fourth flag when predetermined conditions determined on the basis of the first flag, the second flag, and the third flag are satisfied, wherein the first flag indicates whether prediction of the current block by dividing the current block into two or more partitions according to a pattern is permitted, the second flag indicates whether the depth image permits blocks of the depth image to be predicted by dividing the blocks into two or more partitions by using a wedgelet, the third flag indicates whether the depth image permits the blocks of the depth image to be predicted by dividing the blocks into two or more partitions by using a contour, and the fourth flag represents information regarding a type of a method of dividing the current block into two or more partitions according to a pattern.

According to another aspect, there is provided a computer-readable recording medium having recorded thereon a program for executing the interlayer video decoding method or the interlayer video encoding method on a computer.

Mode of the Invention

Hereinafter, a method of predicting a depth image for an interlayer video decoding and encoding apparatus and method according to an embodiment will be suggested with reference to FIGS. 1A to 6.

Also, with reference to FIGS. 7 through 19, a video encoding technique and a video decoding technique, which are based on coding units having a tree structure, according to embodiments applicable to the inter-layer video encoding and decoding techniques will be described. Also, with reference to FIGS. 20 through 26, embodiments to which the video encoding method and the video decoding method are applicable will be described.

Hereinafter, an 'image' may denote a still image or a moving image of a video, or a video itself.

Hereinafter, a 'sample' denotes data that is assigned to a sampling location of an image and is to be processed. For example, pixels in an image of a spatial domain may be samples.

Hereinafter, the term 'current block' may be understood as a unit block of a depth image to be encoded or decoded.

First, a method of predicting a depth image and a method of transmitting a prediction mode for an interlayer video decoding and encoding apparatus and method according to an embodiment will be described with reference to FIGS. 1A to 6 below.

Figure 1B:
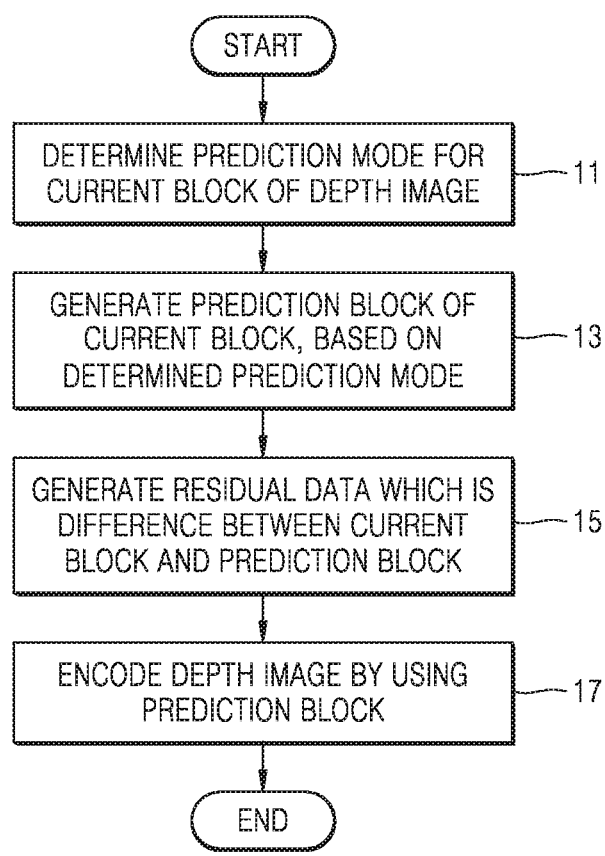
FIG. 1B is a flowchart of a video encoding method according to an embodiment.

FIG. 1A is a block diagram of an interlayer video encoding apparatus 10 according to an embodiment. FIG. 1B is a flowchart of a video encoding method according to an embodiment.

The interlayer video encoding apparatus 10 according to an embodiment may include a prediction mode determiner 12, a prediction block generator 14, a residual data generator 16, and an encoder 18. The interlayer video encoding apparatus 10 according to an embodiment may further include a central processing unit (CPU) (not shown) configured to control overall operations of the prediction mode determiner 12, the prediction block generator 14, the residual data generator 16, and the encoder 18. Alternatively, the prediction mode determiner 12, the prediction block generator 14, the residual data generator 16, and the encoder 18 may be individually operated by processors thereof (not shown). As the processors are operated in conjunction with one another, the interlayer video encoding apparatus 10 may be wholly operated. Alternatively, the prediction mode determiner 12, the prediction block generator 14, the residual data generator 16, and the encoder 18 may be controlled under control of an external processor (not shown) of the interlayer video encoding apparatus 10.

The interlayer video encoding apparatus 10 may include at least one data storage unit (not shown) configured to store data input to or output from the prediction mode determiner 12, the prediction block generator 14, the residual data generator 16, and the encoder 18. The interlayer video encoding apparatus 10 may include a memory controller (not shown) controlling input of data to and output of data from the at least one data storage unit.

In order to output a video encoding result, the interlayer video encoding apparatus 10 may be operated in conjunction with a video encoding processor installed therein or an external video encoding processor and thus perform a video encoding operation including transformation. The video encoding processor installed in the interlayer video encoding apparatus 10 may be a separate processor and perform a video encoding operation. Alternatively, the interlayer video encoding apparatus 10, a CPU, or a graphic operation device may include a video encoding processing module and perform a basic video encoding operation.

The inter-layer video encoding apparatus 10 according to an embodiment may classify a plurality of image sequences according to layers and may encode each of the image sequences, according to a scalable video coding scheme, and may output separate streams including data encoded according to layers. The inter-layer video encoding apparatus 10 may encode a first layer image sequence and a second layer image sequence to different layers.

For example, according to a scalable video coding method based on spatial scalability, low resolution images may be encoded as first layer images, and high resolution images may be encoded as second layer images. An encoding result of the first layer images may be output as a first layer stream, and an encoding result of the second layer images may be output as a second layer stream.

As another example, a multi-view video may be encoded according to a scalable video coding scheme. In this regard, central-view images may be encoded as first layer images, and left-view images and right-view images may be encoded as second layer images that refer to the first layer images. Alternatively, when the inter-layer video encoding apparatus 10 allows three or more layers including a first layer, a second layer, a third layer, etc., the central-view images may be encoded as first layer images, the left-view images may be encoded as second layer images, and the right-view images may be encoded as third layer images. However, the present disclosure is not necessarily limited thereto, and layers that the center view images, the left-view images, and the right-view images are encoded, and layers to be referred may be changed.

As another example, a scalable video coding method may be performed according to temporal hierarchical prediction based on temporal scalability. A first layer stream including encoding information generated by encoding base frame rate images may be output. Temporal levels may be classified according to frame rates and each temporal level may be encoded according to layers. A second layer stream including encoding information of a high frame rate may be output by further encoding high frame rate images by referring to the base frame rate images.

Also, scalable video coding may be performed on a first layer and a plurality of second layers. When there are at least three second layers, first layer images and first second layer image, second second layer images, . . . , $K_{th}$ second layer images may be encoded. Accordingly, an encoding result of the first layer images may be output as a first layer stream, and encoding results of the first, second, . . . , $K_{th}$ second layer images may be respectively output as first, second, . . . , $K_{th}$ second layer streams.

The inter-layer video encoding apparatus 10 according to an embodiment may perform inter prediction in which images of a single layer are referenced in order to predict a current image. By performing inter prediction, a motion vector indicating motion information between a current image and a reference image, and a residual component between the current image and the reference image may be generated.

Also, the inter-layer video encoding apparatus 10 may perform inter-layer prediction in which second layer images are predicted by referring to first layer images.

Also, when the inter-layer video encoding apparatus 10 according to an embodiment allows at least three layers, i.e., first, second, and third layers, inter-layer prediction between a first layer image and a third layer image, and inter-layer prediction between a second layer image and a third layer image may be performed according to a multi-layer prediction structure.

In inter-layer prediction, a displacement component between a current image and a reference image of a different layer, and a residual component between the current image and the reference image of the different layer may be generated.

An interlayer prediction scheme will be described with reference to FIG. 3 below.

The inter-layer video encoding apparatus 10 according to an embodiment may perform encoding according to blocks of each image of a video, according to layers. A block may have a square shape, a rectangular shape, or an arbitrary geometrical shape, and is not limited to a data unit having a predetermined size. The block may be a largest coding unit, a coding unit, a prediction unit, or a transformation unit, among coding units according to a tree structure. The largest coding unit including coding units of a tree structure may be called differently, such as a coding tree unit, a coding block tree, a block tree, a root block tree, a coding tree, a coding root, or a tree trunk. Video encoding and decoding methods based on coding units according to a tree structure will be described below with reference to FIGS. 7 through 19.

When the interlayer video encoding apparatus 10 according to an embodiment encodes a multi-view video image, auxiliary data such as a depth image may be additionally encoded to generate images from more viewpoints than viewpoints input from an image decoding side. Here, the depth image is used to synthesize intermediate-viewpoint images rather than being used to be directly viewed to a user. Thus, the quality of a synthetic image may be influenced by whether the depth image deteriorates.

A degree of change in a depth value of a depth image is large near a border of an object and is relatively small inside the object or a background region. Thus, minimizing an error occurring at the border of the object at which the difference between depth values of the depth image is large may be directly related to minimizing an error of a synthetic image. Furthermore, the amount of data of the inside of the object or the background region in which a degree of change in a depth value is small may be reduced to increase an efficiency of encoding the depth image.

Thus, the interlayer video encoding apparatus 10 may encode a current block of the depth image by using an intra-prediction mode such as a DC mode, a planar mode, or an angular mode. Furthermore, the interlayer video encoding apparatus 10 may encode the depth image by using a prediction mode such as a depth modeling mode (DMM), a simplified depth coding (SDC) mode, or a chain coding mode (CCD). The interlayer video encoding apparatus 10 may generate, in units of layers, a flag containing information indicating whether the prediction mode as described above is to be used.

The interlayer video encoding apparatus 10 may generate a prediction block on the basis of a prediction mode, and generate differential data between the generated prediction block and a current block to be encoded, i.e., residual data.

All residual data generated using the prediction mode may not be encoded or only some of the residual data may be encoded. The interlayer video encoding apparatus 10 according to an embodiment may encode an average value of the residual data.

The interlayer video encoding apparatus 10 according to an embodiment may calculate a DC value (hereinafter referred to as an average value) of a block to be encoded, and determine an index by mapping the average value to a depth lookup table. Here, the depth lookup table means a table in which depth values that a depth image may have are respectively matched to indexes.

Furthermore, the interlayer video encoding apparatus 10 may transmit, to a decoding apparatus, only the difference between an index determined by mapping an average value of an original block to the depth lookup table and an index calculated from an average value calculated with respect to the prediction block. In this case, the difference between the indexes may be encoded.

An operation of the interlayer video encoding apparatus 10 according to an embodiment will be described in detail with reference to FIG. 1B below.

In operation 11, the prediction mode determiner 12 may determine a prediction mode for a current block of a depth image. Examples of the prediction mode may include the DC mode, the planar mode, the angular mode, the DMM, and the SDC mode.

Here, the DC mode is an intra-prediction mode using a method of packing predicted samples of a prediction block with average values of reference neighboring samples of a current block.

The planar mode is an intra-prediction mode in which a predicted sample predSample[x],[y] of a reference sample is calculated by [Equation 1] below (here, x and y are each in the range of 0 to nTbs−1).

predSamples[x][y]=((nTbS−1−x)*p[−1][y]+(x+1)*p
[nTbS][−1]+(nTbS−1−y)*p[x][−1]+(y+1)*p[−1]
[nTbS]+nTbS)>>(Log 2(nTbS)+1)  [Equation 1]

Here, nTbS represents a horizontal or vertical size of the prediction block.

The angular mode is an intra-prediction mode in which predicted samples are determined using reference samples by taking into account the directionalities of a mode 2 to a mode 34 among prediction modes in a screen.

The DMM prediction mode is a method of exactly and efficiently expressing a border of a depth image through a depth modeling mode technique. In detail, in the DMM prediction mode, a current block is predicted by dividing it into at least two regions according to a pattern. The current block may be divided into at least two regions by using a wedgelet and contour, and an average value of each of the at least two regions may be calculated.

The DMM prediction mode may include DMM mode-1 type (which may be also referred to as a DMM_WFULL mode or INTRA_DEP_WEDGE) and DMM mode-4 type (which may be also referred to as a DMM_CPREDTEX mode or INTRA_DEP_CONTOUR). DMM mode-1 is a wedgelet mode in which the interlayer video encoding apparatus 10 divides the current block into two regions by applying various border lines thereto the current block and then divides the current block into regions by a most appropriate border line. In this case, the Vedgelef means an oblique line. A wedgelet partition means two or more partitions divided from a current block, which is to be prediction encoded, by an oblique line.

DMM mode-4 is a mode in which a prediction block is divided into at least two regions according to a pattern of texture of a current block, and a contour partition may be determined using a block of a corresponding texture image. In this case, the contour means a curve including a certain shape. A contour partition means two or more partitions divided from a current block, which is to be prediction encoded, by using a contour line.

The DMM mode-1 and the DMM mode-4 will be described in more detail with reference to FIG. 4B below.

An SDC prediction mode is a mode used when residual data is encoded in a DC form or is not encoded, based on that a degree of change in a depth value is small inside an object and a background region. A DC component of the residual data is a pixel value of a residual block and may be determined to be an average value of all or some of pixel values of the residual block.

The SDC prediction mode may include an SDC intra-prediction mode and an SDC inter-prediction mode. For example, the SDC intra-prediction mode may include the DC mode, the DMM mode-1, the DMM mode-4, and a planar prediction mode. The interlayer video encoding apparatus 10 may predict and encode a current block by using a highly probable representative mode among representative modes included in the SDC intra-prediction mode. The SDC inter-prediction mode may include a certain prediction mode, and vary according to a partition mode. For example, the SDC inter-prediction mode may be permitted only when a partition mode is 2N×2N, and may not be permitted when the partition mode is 2N×N, N×2N, N×N, or the like.

The prediction mode determiner 12 may generate a current depth image and a flag containing information regarding a prediction mode for a current block of the current depth image. The flag containing the information regarding the prediction mode will be described with reference to FIGS. 4 to 6 below.

In operation 13, the prediction block generator 14 may generate a prediction block of the current block on the basis of the determined prediction mode.

In operation 15, the residual data generator 16 may generate residual data which is the difference between the current block and the prediction block. The residual data generator 16 according to an embodiment may not transmit the residual data to the encoder 18 or may calculate an average value of all or some of the residual data and transmit it to the encoder 18.

For example, the residual data generator 16 may calculate an average value from values of an upper left pixel, an upper right pixel, a lower left pixel, and a lower right pixel which are present in a residual block which is the difference between the current block and the prediction block, and transmit it to the encoder 18. In detail, the residual data generator 16 may calculate a weighted sum of the values of the upper left and right pixels and the lower left and right pixels in a prediction block rather than calculating an average value of all the values of the pixels included in the residual block. However, the present disclosure is not limited thereto, and an average value of the residual block may be predicted using a value of at least one pixel according to the location of each pixel (e.g., values of four upper left pixels and four upper right pixels).

Alternatively, the residual data generator 16 may differently calculate an average value of the residual block according to the prediction mode. For example, when the prediction block is predicted using the DC mode or the planar mode, the residual data generator 16 may calculate an average value of the residual block from the values of the upper left and right pixels and the lower left and right pixels of the residual block and transmit it to the encoder 18.

When the prediction block is predicted using the DMM prediction mode, the residual data generator 16 may predict an average value of each of regions divided from the residual block from the values of the upper left and right pixels and the lower left and right pixels of the residual block.

As another example, the average value calculator 16 may predict an average value of the residual block by using values of pixels on different locations according to a prediction mode of the current block.

As another example, the residual data generator 16 may not transmit the residual data to the encoder 18 when the prediction block is predicted using a horizontal-direction prediction mode or a vertical-direction prediction mode among angular modes.

The interlayer video encoding apparatus 10 may generate a bitstream containing information regarding the prediction mode and the residual data to encode the depth image.

Figure 2A:
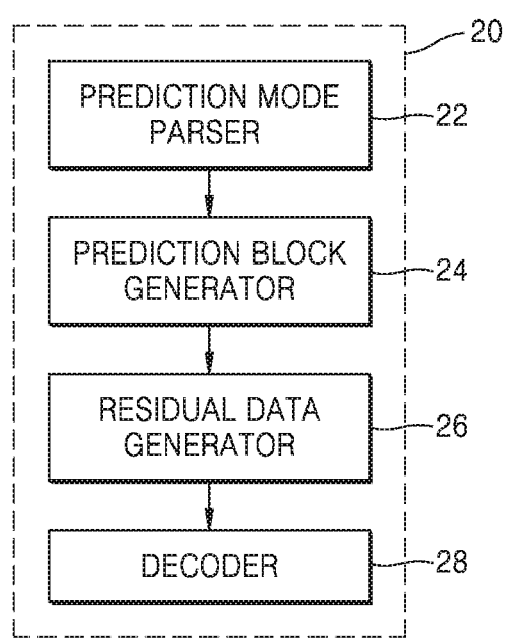
FIG. 2A is a block diagram of an interlayer video decoding apparatus according to an embodiment.

FIG. 2A is a block diagram of an interlayer video decoding apparatus 20 according to an embodiment.

The interlayer video decoding apparatus 20 according to an embodiment may include a parser 22 (is also referred to as prediction mode parser 22 or prediction mode determiner 22), a prediction block generator 24, a residual data generator 26, and a decoder 28. The interlayer video decoding apparatus 20 according to an embodiment may further include a CPU (not shown) controlling overall operations of the parser 22, the prediction block generator 24, the residual data generator 26, and the decoder 28. Alternatively, the parser 22, the prediction block generator 24, the residual data generator 26, and the decoder 28 may be operated by processors thereof (not shown), and the interlayer video decoding apparatus 20 may be wholly operated as the processors are operated in conjunction with one another. Alternatively, the parser 22, the prediction block generator 24, the residual data generator 26, and the decoder 28 may be controlled under control of an external processor (not shown) of the interlayer video decoding apparatus 20 according to an embodiment.

Alternatively, the interlayer video decoding apparatus 20 according to an embodiment may include at least one data storage unit (not shown) configured to store data input to or output from the parser 22, the prediction block generator 24, the residual data generator 26, and the decoder 28. The interlayer video decoding apparatus 20 may include a memory controller (not shown) configured to control input of data to or output of data from the at least one data storage unit.

In order to reconstruct video through video decoding, the interlayer video decoding apparatus 20 according to an embodiment may perform video decoding including inverse transformation by being operated in conjunction with a video decoding processor installed therein or an external video decoding processor. The video decoding processor installed in the interlayer video decoding apparatus 20 according to an embodiment may be understood as including not only a separate processor but also a video decoding processing module included in the interlayer video decoding apparatus 20, a CPU, or a graphics operation device to perform a basic video decoding operation.

The inter-layer video decoding apparatus 20 according to an embodiment may receive bitstreams according to layers, according to a scalable encoding scheme. The number of layers of bitstreams received by the inter-layer video decoding apparatus 20 is not limited.

For example, the inter-layer video decoding apparatus 20 based on spatial scalability may receive a stream in which image sequences having different resolutions are encoded in different layers. A first layer stream may be decoded to reconstruct an image sequence having low resolution and a second layer stream may be decoded to reconstruct an image sequence having high resolution.

As another example, a multi-view video may be decoded according to a scalable video coding scheme. When a stereoscopic video stream is received in a plurality of layers, a first layer stream may be decoded to reconstruct left-view images. A second layer stream may be further decoded to reconstruct right-view images.

Alternatively, when a multi-view video stream is received in a plurality of layers, a first layer stream may be decoded to reconstruct central-view images. A second layer stream may be further decoded to reconstruct left-view images. A third layer stream may be further decoded to reconstruct right-view images.

As another example, a scalable video coding method based on temporal scalability may be performed. A first layer stream may be decoded to reconstruct base frame rate images. A second layer stream may be further decoded to reconstruct high frame rate images.

Also, when there are at least three second layers, first layer images may be reconstructed from a first layer stream, and when a second layer stream is further decoded by referring to first layer reconstruction images, second layer images may be further reconstructed. When a $K_{th}$ layer stream is further decoded by referring to second layer reconstruction images, $K_{th}$ layer images may be further reconstructed.

The inter-layer video decoding apparatus 20 may obtain encoded data of first layer images and second layer images from a first layer stream and a second layer stream, and in addition, may further obtain a motion vector generated via inter prediction and prediction information generated via inter-layer prediction.

For example, the inter-layer video decoding apparatus 20 may decode inter-predicted data per layer, and may decode inter-layer predicted data between a plurality of layers. Reconstruction may be performed through motion compensation and inter-layer decoding based on a coding unit or a prediction unit.

Images may be reconstructed by performing motion compensation for a current image by referencing reconstruction images predicted via inter prediction of a same layer, with respect to each layer stream. The motion compensation is an operation in which a reconstruction image of the current image is reconstructed by synthesizing a reference image determined by using a motion vector of the current image and a residual of the current image.

Alternatively, the interlayer video decoding apparatus 20 may perform interlayer decoding by referring to prediction information of first layer images so as to decode a second layer image predicted through interlayer prediction. The interlayer decoding means reconstructing prediction information of a current image by using prediction information of reference blocks of other layers so as to determine the prediction information of the current image.

The inter-layer video decoding apparatus 20 according to an embodiment may perform inter-layer video decoding for reconstructing third layer images predicted by referring to second layer images. The inter-layer prediction structure will be described in detail with reference to FIG. 3.

The inter-layer video decoding apparatus 20 performs decoding according to blocks of each image of a video. A block may be, from among coding units according to a tree structure, a largest coding unit, a coding unit, a prediction unit, or a transformation unit. A video encoding/decoding method based on coding units having a tree structure will be described with reference to FIGS. 7 to 20 below.

When the interlayer video decoding apparatus 20 according to an embodiment reconstructs a multi-view video image, auxiliary data such as a depth image may be additionally decoded to generate images from more viewpoints than viewpoints input from an image decoding side. Here, the depth image is used to synthesize intermediate-viewpoint images rather than being used to be directly viewed to a user. Thus, the quality of a synthetic image may be influenced according to whether the depth image deteriorates.

A degree of change in a depth value of the depth image is large near a border of an object and is relatively small inside the object. Thus, minimizing an error occurring at the border of the object at which the difference between depth values is large may be directly related to minimizing an error in a synthetic image. Furthermore, the efficiency of decoding the depth image may increase when the amount of data of the inside of the object in which the degree of change in the depth value of the depth image is small is reduced.

The interlayer video decoding apparatus 20 may decode the depth image by using an intra-prediction mode such as the DC mode, the planar mode, or the angular mode. Alternatively, the interlayer video decoding apparatus 20 may decode the depth image by using a prediction mode such as the DMM, the SDC mode, or the CCD mode. The DC mode, the planar mode, or the angular, the DMM, and the SDC mode have been described above with reference to FIG. 1.

The interlayer video decoding apparatus 20 may obtain a depth image and a flag containing information regarding a prediction mode for a current block of the depth image (i.e., a coding/decoding unit). The interlayer video decoding apparatus 20 according to an embodiment may receive the flag containing the information regarding the prediction mode from a video parameter set network abstraction layer (VPS NAL) unit containing commonly used parameter information so as to decode encoded data of a basic layer and an enhancement layer. In another embodiment, the interlayer video decoding apparatus 20 may receive the flag containing the information regarding the prediction mode from a sequence parameter set (SPS) NAL unit or a picture parameter set (PPS) NAL unit.

A PPS is a set of parameters for at least one picture. For example, the PPS is a set of parameters containing parameter information to be commonly used to encode video coding data of the at least one picture. The PPS NAL unit is a NAL unit containing the PPS. The SPS is a set of parameters for a sequence. The sequence is a set of at least one picture. For example, the SPS may include parameter information to be commonly used to encode encoding data of pictures which are encoded by referring to at least one PPS.

The interlayer video decoding apparatus 20 may generate a prediction block of the current block to decode the depth image by using an intra-prediction mode such as the DC mode, the planar mode, or the angular mode. Alternatively, the interlayer video decoding apparatus 20 may generate a prediction block of the current block by using the DMM, the SDC mode, or the CCD mode. Alternatively, the interlayer video decoding apparatus 20 may receive differential data between the generated prediction block and the current block to be decoded, i.e., residual data, from a bitstream.

Alternatively, the interlayer video decoding apparatus 20 according to an embodiment may calculate a DC value (hereinafter referred to as an average value) of the prediction block, and calculate an index by mapping the average value to a depth lookup table. Alternatively, the interlayer video decoding apparatus 20 may receive, from a bitstream, the difference between a reconstructed index corresponding to an average value of a reconstructed block and a predicted index corresponding to an average value of the prediction block.

Figure 2B:
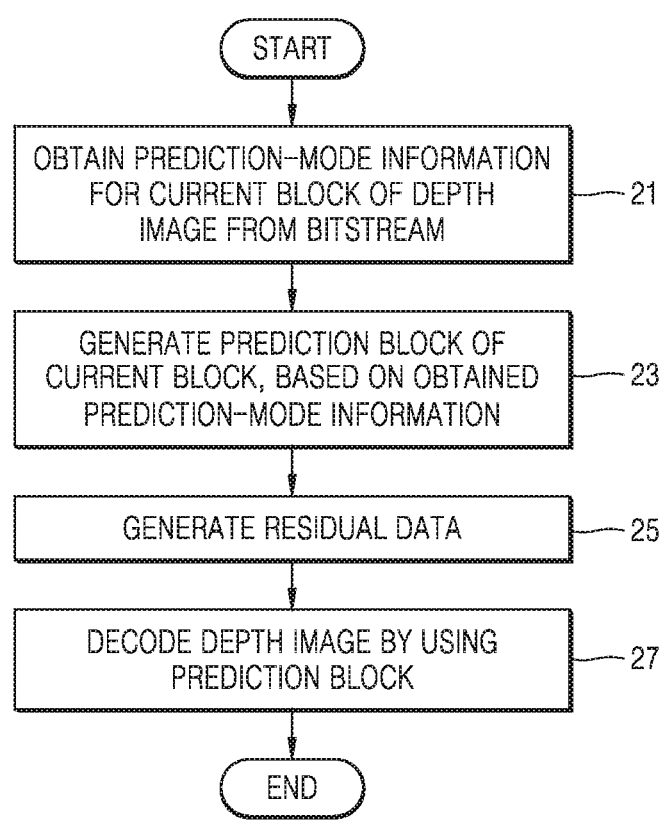
FIG. 2B is a flowchart of a video decoding method according to an embodiment.

An operation of the interlayer video decoding apparatus 20 according to an embodiment will be described in detail with reference to FIG. 2B below.

In operation 21, the parser 22 may obtain prediction-mode information for a current block of a depth image from a bitstream. The prediction-mode information is used to reconstruct the depth image and the current block, and may include information indicating whether the DC mode, the planar mode, the angular mode, the DMM, or the SDC mode is to be used.

The parser 22 may parse a flag containing the prediction-mode information in operation 21. The parser 22 may receive, from the bitstream, a flag indicating whether the depth image permits prediction of blocks of the depth image by using the DMM mode-1 or the DMM mode-4 and whether a DMM prediction mode is permitted for a current image which is to be decoded. The interlayer video decoding apparatus 10 may additionally receive a flag indicating information regarding the type of the DMM prediction mode for the current image from the bitstream only when a predetermined condition is satisfied on the basis of a flag indicating whether the DMM prediction mode is permitted for the current image and a flag indicating whether the depth image permits prediction of blocks of the depth image by using the DMM mode-1 or the DMM mode-4, thereby lowering complexity. The flag containing the prediction-mode information will be described in detail with reference to FIGS. 4A to 6 below.

In operation 23, the prediction block generator 24 may generate a prediction block of the current block on the basis of the obtained prediction-mode information.

In operation 25, the residual data generator 26 may obtain residual data from the bitstream. However, when the prediction mode is a predetermined mode, the residual data may not be decoded.

In operation 27, the decoder 28 may decode the current block and the depth image by using the prediction block.

An interlayer prediction scheme which may be performed by the interlayer video encoding apparatus 10 according to an embodiment will be described with reference to FIG. 3 below.

Figure 3:
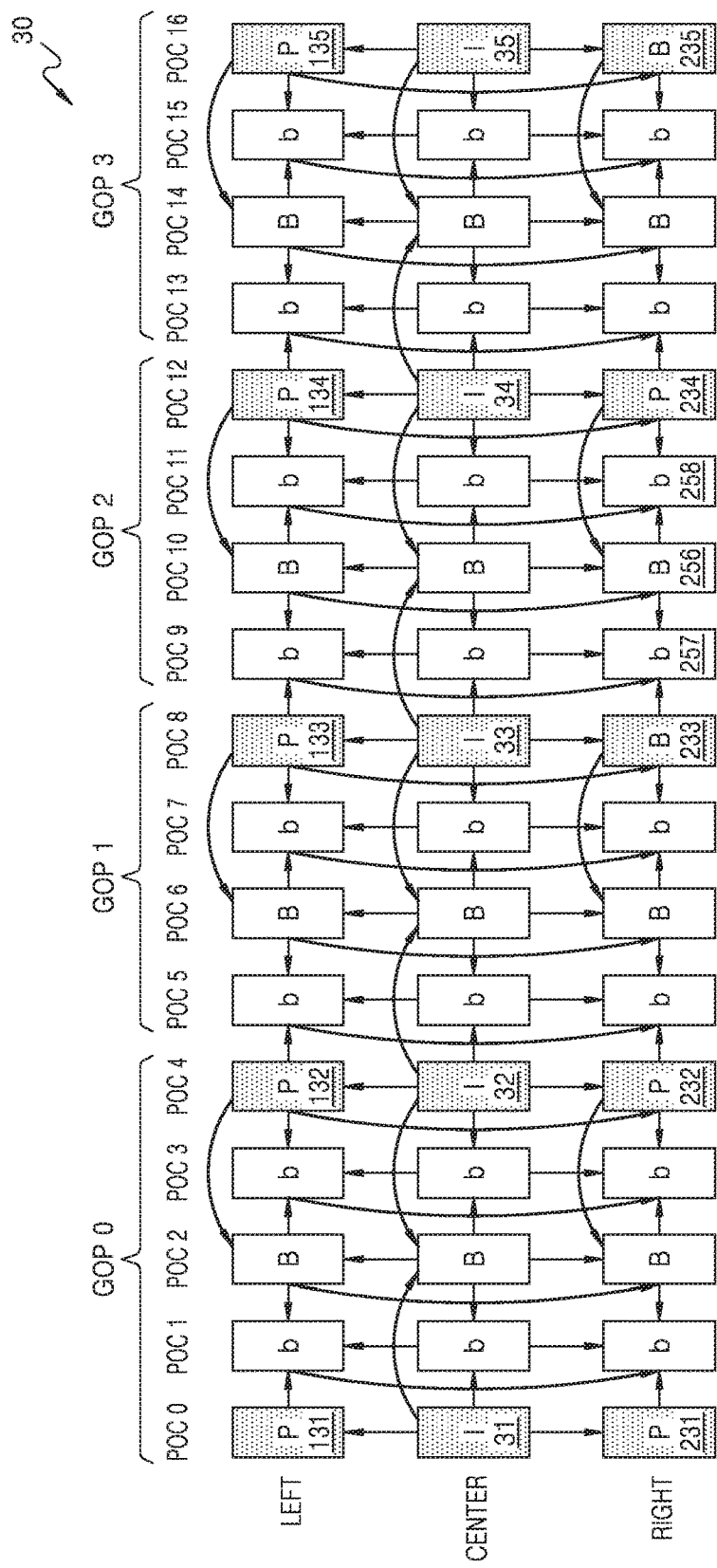
FIG. 3 illustrates an interlayer prediction scheme according to an embodiment.

FIG. 3 illustrates an interlayer prediction scheme according to an embodiment.

The inter-layer video encoding apparatus 10 according to an embodiment may prediction-encode base-view images, left-view images, and right-view images according to a reproduction order 30 of a multiview video prediction structure of FIG. 3.

According to the reproduction order 30 of the multiview video prediction structure according to a related technology, images of the same view are arranged in a horizontal direction. Accordingly, the left-view images indicated by 'Left' are arranged in the horizontal direction in a row, the base-view images indicated by 'Center' are arranged in the horizontal direction in a row, and the right-view images indicated by 'Right' are arranged in the horizontal direction in a row. Compared to the left/right-view images, the base-view images may be central-view images.

Also, images having the same picture order count (POC) order are arranged in a vertical direction. A POC order of images indicates a reproduction order of images forming a video. 'POC X' indicated in the reproduction order 30 of the multiview video prediction structure indicates a relative reproduction order of images in a corresponding column, wherein a reproduction order is in front when a value of X is low, and is behind when the value of X is high.

Thus, according to the reproduction order 30 of the multiview video prediction structure according to the related technology, the left-view images indicated by 'Left' are arranged in the horizontal direction according to the POC order (reproduction order), the base-view images indicated by 'Center' are arranged in the horizontal direction according to the POC order (reproduction order), and the right-view images indicated by 'Right' are arranged in the horizontal direction according to the POC order (reproduction order). Also, the left-view image and the right-view image located on the same column as the base-view image have different views but the same POC order (reproduction order).

Four consecutive images form one group of pictures (GOP) according to views. Each GOP includes images between consecutive anchor pictures, and one anchor picture (key picture).

An anchor picture is a random access point, and when a reproduction location is arbitrarily selected from images arranged according to a reproduction order, i.e., a POC order, while reproducing a video, an anchor picture closest to the reproduction location according to the POC order is reproduced. The base layer images include base layer anchor pictures 31, 32, 33, 34, and 35, the left-view images include left-view anchor pictures 131, 132, 133, 134, and 135, and the right-view images include right-view anchor pictures 231, 232, 233, 234, and 235.

Multiview images may be reproduced and predicted (reconstructed) according to a GOP order. First, according to the reproduction order 30 of the multiview video prediction structure, images included in GOP 0 may be reproduced, and then images included in GOP 1 may be reproduced, according to views. In other words, images included in each GOP may be reproduced in an order of GOP 0, GOP 1, GOP 2, and GOP 3. Also, according to a coding order of the multiview video prediction structure, the images included in GOP 0 may be predicted (reconstructed), and then the images included in GOP 1 may be predicted (reconstructed), according to views. In other words, the images included in each GOP may be predicted (reconstructed) in an order of GOP 0, GOP 1, GOP 2, and GOP 3

According to the reproduction order 30 of the multiview video prediction structure, inter-view prediction (inter-layer prediction) and inter prediction are performed on images. In the multiview video prediction structure, an image where an arrow starts is a reference image, and an image where an arrow ends is an image predicted by using a reference image.

A prediction result of base-view images may be encoded and then output in a form of a base-view image stream, and a prediction result of additional view images may be encoded and then output in a form of a layer bitstream. Also, a prediction encoding result of left-view images may be output as a first layer bitstream, and a prediction encoding result of right-view images may be output as a second layer bitstream.

Only inter-prediction is performed on base-view images. That is, the base layer anchor pictures 31, 32, 33, 34, and 35 of an I-picture type do not refer to other images, but remaining images of B- and b-picture types are predicted by referring to other base-view images. Images of a B-picture type are predicted by referring to an anchor picture of an I-picture type, which precedes the images of a B-picture type according to a POC order, and a following anchor picture of an I-picture type. Images of a b-picture type are predicted by referring to an anchor picture of an I-type, which precedes the image of a b-picture type according a POC order, and a following image of a B-picture type, or by referring to an image of a B-picture type, which precedes the images of a b-picture type according to a POC order, and a following anchor picture of an I-picture type.

Inter-view prediction (inter-layer prediction) that references different view images, and inter prediction that references same view images are performed on each of left-view images and right-view images.

Inter-view prediction (inter-layer prediction) may be performed on the left-view anchor pictures 131, 132, 133, 134, and 135 by respectively referring to the base-view anchor pictures 31, 32, 33, 34, and 35 having the same POC order. Inter-view prediction may be performed on the right-view anchor pictures 231, 232, 233, 234, and 235 by respectively referring to the base-view anchor pictures 31, 32, 33, 34, and 35 or the left-view anchor pictures 131, 132, 133, 134, and 135 having the same POC order. Also, inter-view prediction (inter-layer prediction) may be performed on remaining images other than the left-view images 131, 132, 133, 134, and 135 and the right-view images 231, 232, 233, 234, and 235 by referring to other view images having the same POC.

Remaining images other than the anchor pictures 131, 132, 133, 134, 135, 231, 232, 233, 234, and 235 from among left-view images and right-view images are predicted by referring to the same view images.

However, each of the left-view images and the right-view images may not be predicted by referring to an anchor picture that has a preceding reproduction order from among additional view images of the same view. That is, in order to perform inter prediction on a current left-view image, left-view images excluding a left-view anchor picture that precedes the current left-view image in a reproduction order may be referenced. Equally, in order to perform inter prediction on a current right-view image, right-view images excluding a right-view anchor picture that precedes the current right-view image in a reproduction order may be referenced.

Also, in order to perform inter prediction on a current left-view image, prediction may be performed by referring to a left-view image that belongs to a current GOP but is to be reconstructed before the current left-view image, instead of referring to a left-view image that belongs to a GOP before the current GOP of the current left-view image. The same is applied to a right-view image.

The inter-layer video decoding apparatus 20 according to an embodiment may reconstruct base-view images, left-view images, and right-view images according to the reproduction order 30 of the multiview video prediction structure of FIG. 3.

Left-view images may be reconstructed via inter-view disparity compensation that references base-view images and inter motion compensation that references left-view images. Right-view images may be reconstructed via inter-view disparity compensation that references base-view images and left-view images, and inter motion compensation that references right-view images. Reference images may be reconstructed first for disparity compensation and motion compensation of left-view images and right-view images.

For inter motion compensation of a left-view image, left-view images may be reconstructed via inter motion compensation that references a reconstructed left-view reference image. For inter motion compensation of a right-view image, right-view images may be reconstructed via inter motion compensation that references a reconstructed right-view reference image.

Also, for inter motion compensation of a current left-view image, only a left-view image that belongs to a current GOP of the current left-view image but is to be reconstructed before the current left-view image may be referenced, and a left-view image that belongs to a GOP before the current GOP is not referenced. The same is applied to a right-view image.

A method of receiving prediction-mode information to predict and reconstruct a depth image, performed by an interlayer video decoding apparatus according to an embodiment, will be described with reference to FIGS. 4A to 6 below.

FIG. 4A illustrates a part of SPS 3D extension syntax according to an embodiment.

The interlayer video decoding apparatus 20 according to an embodiment may receive a flag indicating whether a depth image permits an inter-SDC mode among SDC modes. Alternatively, the interlayer video decoding apparatus 20 may receive a flag indicating whether the depth image permits the DMM mode-4 (DMM_CPREDTEX) among DMM prediction modes. Alternatively, the interlayer video decoding apparatus 20 may receive a flag indicating whether the depth image permits the DMM mode-1 (DMM_W-FULL) mode or the intra-SDC mode among the DMM prediction modes.

In FIG. 4A, reference numeral '410' represents a flag intra_contour_enabled_flag[d] indicating whether use of the DMM mode-4 among the DMM prediction modes is allowed. When the flag intra_contour_enabled_flag[d] 410 has a value of 1, a current depth image may permit blocks thereof to be predicted using the DMM mode-4 which is a prediction mode. Thus, a prediction block of the current depth image may be generated and decoded using the DMM mode-4. In contrast, when the flag intra_contour_enabled_flag[d] 410 has a value of 0, the current depth image cannot be decoded using the DMM mode-4. When the flag intra_contour_enabled_flag[d] 410 is not defined, the value of the flag intra_contour_enabled_flag[d] 410 may be estimated to '0'.

In FIG. 4A, reference numeral '420' represents a flag intra_dc_only_wedge_enabled_flag[d] indicating whether use of the DMM mode-1 among the DMM prediction modes is permitted and whether use of the intra-SDC mode is permitted. When the flag intra_dc_only_wedge_enabled_flag[d] 420 has a value of 1, the current depth image permits blocks thereof to be predicted using at least one mode among the DMM mode-1 and the intra-SDC mode. Thus, the current depth image may be decoded by generating a prediction block thereof by using at least one mode among the DMM mode-1 and the intra-SDC mode. In contrast, when the flag intra_dc_only_wedge_enabled_flag[d] 420 has a value of 0, the current depth image cannot be decoded using the DMM mode-1 and the intra-SDC mode. When the flag intra_dc_only_wedge_enabled_flag [d] 420 is not defined, the value of the flag intra_dc_only_wedge_enabled_ flag[d] 420 may be estimated to be '0'.

In FIG. 4A, reference numeral '430' represents a flag inter_dc_only_enabled_flag[d] indicating whether the inter-SDC mode among the DMM prediction modes is permitted. When the flag inter_dc_only_enabled_flag[d] 430 has a value of 1, the current depth image may permit the blocks thereof to be predicted using the inter-SDC mode. Thus, the current depth image may be decoded by generating a prediction block thereof by using the inter-SDC mode. In contrast, when the flag inter_dc_only_enabled_flag[d] 430 has a value of 0, the current depth image cannot be decoded using the inter-SDC mode. When the flag inter_dc_only_enabled_flag[d] 430 is not defined, the value of the flag inter_dc_only_enabled_flag[d] 430 is estimated to be '0'.

FIG. 4B illustrates two types of DMM prediction mode.

As described above, the DMM prediction mode is a method of exactly and efficiently expressing a border of a depth image through the depth modeling mode technique. In detail, in the DMM prediction mode, a current block is predicted by dividing it into at least two regions according to a pattern. The current block may be divided into at least two regions by using a wedgelet and a contour, and an average value of each of the at least two regions may be calculated.

The DMM prediction mode may include the DMM mode-1 type (which may be also referred to as the DMM_WFULL mode or INTRA_DEP_WEDGE) and the DMM mode-4 type (which may be also referred to as the DMM_CPREDTEX mode or INTRA_DEP_CONTOUR).

The interlayer video decoding apparatus 20 may generate a prediction block of a current block and reconstruct the current block by using the DMM mode-1 or the DMM mode-4 which is a wedgelet mode of dividing a current block into two regions by applying various border lines to the current block and then dividing the current block by a most appropriate border line. Furthermore, the interlayer video decoding apparatus 20 may generate a prediction block of a current block and reconstruct the current block by using the DMM mode-1 or the DMM mode-4 which is a wedgelet mode of dividing a current block into two regions by applying various border lines to the current block and then dividing the current block by a most appropriate border line. In this case, the wedgelet means an oblique line. A wedgelet partition means two or more partitions divided from the current block by an oblique line. For convenience of explanation, a case in which the interlayer video decoding apparatus 20 reconstructs the current block by using the DMM prediction mode has been described above but it would be apparent to those of ordinary skill in the art that an operation corresponding to the interlayer video decoding apparatus 20 may be performed by the interlayer video encoding apparatus 10.

The interlayer video decoding apparatus 20 may divide a current block 440 into parts P1 442 and P2 444 by using a wedgelet 443. Furthermore, the interlayer video decoding apparatus 20 may divide a current block 460 into parts P1 462 and P2 464 by using a contour 463.

The DMM mode-1 is a prediction mode in which the positions of a starting point and an end point of the wedgelet 443 are expressed using a predetermined table and information thereof is transmitted according to a method of directly transmitting information regarding the wedgelet 443 in a bitstream. The interlayer video decoding apparatus 20 may divide the current block 440 into the parts P1 442 and P2 444 by obtaining information regarding the positions of the starting and ending points of the wedgelet 443 from the bitstream.

The DMM mode-4 is a prediction mode in which a co-located texture luma block (CTLB) which is a texture image block 480 at the same position as the current block 460 is referred to obtain information regarding the contour 463. The interlayer video decoding apparatus 20 may calculate an average brightness value of the texture image block 480, split the texture image block 480 by using the average brightness value as a threshold value, and uniformly apply split information thereof to the current block 460. The interlayer video decoding apparatus 20 may divide the current block 460 into the parts P1 462 and P2 464 on the basis of the split information of the texture image block 480.

The interlayer video decoding apparatus 20 according to an embodiment may predict each of regions, which are divided from a current block by using a wedgelet or a contour, using one DC value. For example, values of all pixels belonging to the part P1 442 may be predicted using a DC value of the part P1 442, and values of all pixels belonging to the part P2 444 may be predicted using a DC value of the part P2 444.

FIG. 5 illustrates a part of coding_unit syntax according to an embodiment.

In FIG. 5, reference numeral '550' represents an if-clause inquiring whether a DMM prediction mode for a current depth image is permitted to perform intra_mode_ext for achieving DMM prediction mode parameters. That is, when one of flags IntraContourEnabledFlag and IntraDCOnlyWedgeEnabledFlag has a value of 1, intra_mode_ext may be executed to predict a current block by using the DMM prediction mode. The flags IntraDCOnlyWedgeEnabledFlag and IntraContourEnabledFlag will be described using [Equation 2] below.

In FIG. 5, reference numeral '570' represents a flag no_dim_flag[x0+i][y0+j] indicating whether the DMM prediction mode is permitted with respect to the current block. When the flag no_dim_flag[x0+i][y0+j] 570 has a value of 1, the DMM prediction mode is not permitted for a current block corresponding to the flag no_dim_flag[x0+i][y0+j] 570. In contrast, when the flag no_dim_flag [x0+i][y0+j] 570 has a value of 0, the DMM prediction mode is permitted for the current block corresponding to the flag no_dim_flag [x0+i][y0+j].

FIG. 6 illustrates intra_mode_ext syntax for receiving DMM parameters.

The interlayer video decoding apparatus 20 may additionally receive a flag depth_intra_mode_idx_flag[x0][y0] 650 representing the type of a DMM prediction mode for a current block. The flag depth_intra_mode_idx_flag[x0][y0] 650 may indicate that the current block may be predicted using the DMM mode-1 when the flag depth_intra_mode_idx_flag[x0][y0] 650 has a value of 0, and indicate that the current block may be predicted using the DMM mode-4 when the flag depth_intra_mode_idx_flag[x0][y0] 650 has a value of 1, but the present disclosure is not limited thereto.

An if-clause 630 represents a condition for receiving the flag depth_intra_mode_flag[x0][y0] 650. In the if-clause 630, the flag depth_intra_mode_flag[x0][y0] 650 may be received only when the flag no_dim_flag 570 is '0', the flag IntraDCOnlyWedgeEnabledFlag is '1', and the flag IntraContourEnabledFlag is '1'.

The flag IntraDCOnlyWedgeEnabledFlag may represent whether prediction of the current block using the DMM mode-1 is permitted. The flag IntraContourEnabledFlag may represent whether prediction of the current block using the DMM mode-4 is permitted. The flags IntraDCOnlyWedgeEnabledFlag and IntraContourEnabledFlag may be defined by [Equation 2] below.

IntraContourEnabledFlag=intra_contour_enabled_flag
[Depthflag]&&in_comp_pred_flag IntraDCOnlyWedgeEnabledFlag=intra_dc_only_
wedge_enabled_flag[DepthFlag]  [Equation 2]

The flag IntraContourEnabledFlag is determined by intra_contour_enabled_flag [d] and in_comp_pred_flag described above. in_comp_pred_flag represents information indicating whether a texture image corresponding to a depth image may be referred to for the depth image. in_comp_pred_flag may indicate that the texture image corresponding to the depth image can be referred to when in_comp_pred_flag has a value of 1 and cannot be referred to when in_comp_pred_flag has a value of 0. That is, when a texture image corresponding to a current depth image cannot be referred to (in_comp_pred_flag=0), the current block cannot be predicted using the DMM mode-4. Thus, IntraContourEnabledFlag is '0'.

The flag IntraDCOnlyWedgeEnabledFlag is the same as intra_dc_only_wedge_enabled_flag[d] described above.

Thus, it may be indicated that prediction of a depth image to which the current block belongs using the DMM mode-1 or the intra-SDC mode is permitted when IntraDCOnlyWedgeEnabledFlag has a value of 1, and is not permitted when IntraDCOnlyWedgeEnabledFlag has a value of 0. Furthermore, it may be indicated that prediction of the depth image to which the current block belongs using the DMM mode-4 is permitted when IntraContourEnabledFlag has a value of 1 and is not permitted when IntraContourEnabledFlag has a value of 0.

In other words, when the prediction of the depth image to which the current block belongs using either the DMM mode-1 or the DMM-mode-4 is not permitted, the flag indicating the information regarding the type of the DMM prediction mode for the current block may not be received, thereby reducing device complexity.

If the flag no_dim_flag 570 is '0', IntraContourEnabledFlag is '1', and IntraDCOnlyWedgeEnabledFlag is '0', the type of the DMM prediction mode for the current block may be determined to be DMM mode-4 without receiving the flag depth_intra_mode_flag[x0][y0] 650. If the flag no_dim_flag 570 is '0', IntraContourEnabledFlag is '0', and IntraDCOnlyWedgeEnabledFlag is '1', the type of the DMM prediction mode for the current block may be determined to be the DMM mode-1 without receiving the flag depth_intra_mode_flag[x0][y0] 650.

The interlayer video decoding apparatus 20 may receive, from the interlayer video encoding apparatus 10, a bitstream containing the flag no_dim_flag 570 and encoded by context-based adaptive binary arithmetic coding (CABAC), and decode the bitstream by ABAC. In this case, the flag no_dim_flag 570 may be transmitted using an independent context model without referring to information regarding neighboring blocks.

Although for convenience of explanation, only operations performed by the interlayer video decoding apparatus 20 have been described above in detail with reference to FIGS. 4 to 6 without describing operations of the interlayer video encoding apparatus 10, it would be apparent to those of ordinary skill in the art that operations corresponding to the operations of the interlayer video decoding apparatus 20 may be performed by the interlayer video encoding apparatus 10.

In the interlayer video encoding apparatus 10 and the interlayer video decoding apparatus 20 according to an embodiment, blocks in which video data is split may be divided into coding units having a tree structure, and coding units, prediction units, and transformation units may be used to perform interlayer prediction or inter-prediction on the coding units as described above. A video encoding method and apparatus and a video decoding method and apparatus according to an embodiment, which are based on coding units and transformation units having a tree structure, will be described with reference to FIGS. 7 to 19.

Figure 7:
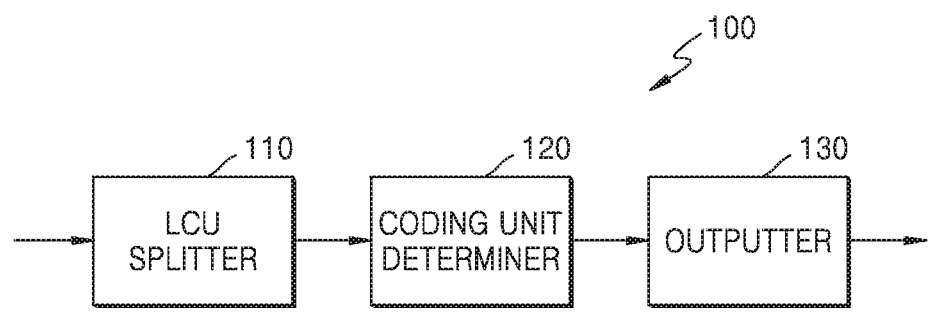
FIG. 7 is a block diagram of a video encoding apparatus based on coding units according to a tree structure, according to an embodiment.

FIG. 7 is a block diagram of a video encoding apparatus 100 based on coding units having a tree structure, according to an embodiment.

The video encoding apparatus 100 which will be described below is one embodiment of the interlayer video encoding apparatus 10 described above with reference to FIG. 1A. Thus, although not described here, the above description of the interlayer video encoding apparatus 10 may also apply to the video encoding apparatus 100.

The video encoding apparatus involving video prediction based on coding units according to a tree structure 100 according to an embodiment includes a largest coding unit splitter 110, a coding unit determiner 120, and an output unit 130. Hereinafter, for convenience of description, the video encoding apparatus involving video prediction based on coding units according to a tree structure 100 will be abbreviated to the 'video encoding apparatus 100'.

The largest coding unit splitter 110 may split a current picture based on a largest coding unit that is a coding unit having a maximum size for the current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2. Image data of at least one largest coding unit may be output to the coding unit determiner 120.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a minimum coding unit. A depth of the largest coding unit is an uppermost depth and a depth of the minimum coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. That is, the coding unit determiner 120 determines a coded depth by encoding the image data in the deeper coding units according to depths, according to the largest coding unit of the current picture, and selecting a depth having the minimum coding error. The determined coded depth and image data according to each largest coding unit are output to the output unit 130.

The image data in the largest coding unit is encoded based on the deeper coding units corresponding to at least one depth equal to or below the maximum depth, and results of encoding the image data are compared based on each of the deeper coding units. A depth having the minimum coding error may be selected after comparing encoding errors of the deeper coding units. At least one coded depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the coded depths may differ according to regions in the image data. Thus, one or more coded depths may be determined in one largest coding unit, and the image data of the largest coding unit may be divided according to coding units of at least one coded depth.

Accordingly, the coding unit determiner 120 according to an embodiment may determine coding units having a tree structure included in the largest coding unit. The 'coding units having a tree structure' according to an embodiment include coding units corresponding to a coded depth determined to be the coded depth, from among all deeper coding units included in the largest coding unit. A coding unit of a coded depth may be hierarchically determined according to depths in the same region of the largest coding unit, and may be independently determined in different regions. Similarly, a coded depth in a current region may be independently determined from a coded depth in another region.

A maximum depth according to an embodiment is an index related to the number of splitting times from a largest coding unit to a minimum coding unit. A first maximum depth according to an embodiment may denote the total number of splitting times from the largest coding unit to the minimum coding unit. A second maximum depth according to an embodiment may denote the total number of depth levels from the largest coding unit to the minimum coding unit. For example, when a depth of the largest coding unit is 0, a depth of a coding unit, in which the largest coding unit is split once, may be set to 1, and a depth of a coding unit, in which the largest coding unit is split twice, may be set to 2. In this case, if the minimum coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a largest coding unit.

The video encoding apparatus 100 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit corresponding to a coded depth according to an embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type according to an embodiment may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra-mode, a inter mode, and a skip mode. For example, the intra-mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a minimum coding error.

Also, the video encoding apparatus 100 according to an embodiment may also perform the transformation on the image data in a coding unit based not only on the coding unit for encoding the image data, but also based on a data unit that is different from the coding unit. In order to perform the transformation in the coding unit, the transformation may be performed based on a transformation unit having a size less than or equal to the coding unit. For example, the transformation unit may include a data unit for an intra-mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, the transformation unit having the tree structure may be set according to the transformation depths.

Encoding information according to coded depths requires not only information about a coded depth, but also requires information related to prediction encoding and transformation. Accordingly, the coding unit determiner 120 not only determines a coded depth having a minimum coding error, but also determines a partition type of splitting a prediction unit into a partition, a prediction mode according to prediction units, and a size of a transformation unit for transformation.

Coding units according to a tree structure in a largest coding unit and methods of determining a prediction unit/partition, and a transformation unit, according to an embodiment, will be described in detail below with reference to FIGS. 7 through 19.

The coding unit determiner 120 may measure an encoding error of deeper coding units according to depths by using Rate-Distortion Optimization based on Lagrangian multipliers.

The output unit 130 outputs the image data of the largest coding unit, which is encoded based on the at least one coded depth determined by the coding unit determiner 120, and information about encoding modes according to depths, in bitstreams.

The encoded image data may be obtained by encoding residual data of an image.

The information about encoding modes according to depths may include coded depth information, partition type information of the prediction unit, transformation unit size information, or the like.

The coded depth information may be defined by using split information according to depths, which indicates whether encoding is performed on coding units of a lower depth instead of a current depth. If the current depth of the current coding unit is a coded depth, the current coding unit is encoded by coding units of the current deoth, and thus the split information of the current depth may be defined not to split the current coding unit to a lower depth. On the other hand, if the current depth of the current coding unit is not the coded depth, the encoding has to be performed by using the coding unit of the lower depth, and thus the split information of the current depth may be defined to split the current coding unit to the coding units of the lower depth.

If the current depth is not the coded depth, encoding is performed on the coding unit that is split into the coding units of the lower depth. Since one or more coding units of the lower depth exist in one coding unit of the current depth, the encoding is repeatedly performed on each coding unit of the lower depth, and thus the encoding may be recursively performed for the coding units having the same depth.

Since the coding units having a tree structure are determined for one largest coding unit, and information regarding at least one encoding mode has to be determined for a coding unit of a coded depth, at least one piece of encoding mode information may be determined for one largest coding unit. Also, a coded depth of the image data of the largest coding unit may vary according to locations since the image data is hierarchically split according to depths, and thus the coded depth and the encoding mode information may be set for the image data.

Accordingly, the output unit 130 according to an embodiment may assign the coded depth and the encoding mode information to at least one of the coding unit, the prediction unit, and a minimum unit included in the largest coding unit.

The minimum unit according to an embodiment is a square data unit obtained by splitting the minimum coding unit constituting the lowermost coded depth by 4. Alternatively, the minimum unit according to an embodiment may be a largest square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include prediction-mode information and partition size information. The encoding information transmitted in a unit of a prediction unit may include information about an estimated direction of an inter mode, about a reference image index of the inter mode, about a motion vector, about a chroma component of an intra-mode, and about an interpolation method of the intra-mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information related to prediction described above with reference to FIGS. 1 through 6, prediction information, uni-directional prediction information, slice type information including a fourth slice type, or the like.

In the video encoding apparatus 100 according to the simplest embodiment, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100 according to an embodiment, image compression efficiency may be increased since a coding unit is adjusted while considering characteristics of an image while increasing a maximum size of the coding unit while considering a size of the image.

The video encoding apparatus 100 of FIG. 7 may perform the operations of the video encoding apparatus 10 described above with reference to FIG. 1.

The coding unit determiner 120 may perform an operation of the intra-predictor 12 of the video encoding apparatus 10. For each of largest coding units, prediction units for intra-prediction may be determined in units of coding units having a tree structure, and intra-prediction may be performed on the prediction units.

The output unit 130 may perform an operation of the symbol encoder 14 of the video encoding apparatus 10. For each of the prediction units, an MPM flag may be encoded for intra-prediction mode prediction. When an intra-prediction mode of a current prediction unit is the same as at least one of intra-prediction modes of left/upper prediction units, a fixed number of candidate intra-prediction modes may be determined, and current intra-mode information for a current prediction unit may be determined and encoded on the basis of the candidate intra-prediction modes regardless of whether a left intra-prediction mode and an upper intra-prediction mode are the same or not.

The output unit 130 may determine the number of candidate intra-prediction modes for each of pictures. Similarly, the number of candidate intra-prediction modes may be determined for each of slices, each of largest coding units, each of coding units, or each of prediction units. However, the present disclosure is not limited thereto, and the number of candidate intra-prediction modes may be determined for each of predetermined data units.

The output unit 130 may encode information representing the number of candidate intra-prediction modes as a parameter of various data-unit levels (such as a picture parameter set (PPS), a slice parameter set (SPS), a largest-coding-unit level, a coding-unit level, a prediction-unit level, etc.) according to the level of a data unit for updating the number of candidate intra-prediction modes. However, even if the number of candidate intra-prediction modes is determined in units of predetermined data units, the information representing the number of candidate intra-prediction modes is not always encoded.

Figure 8:
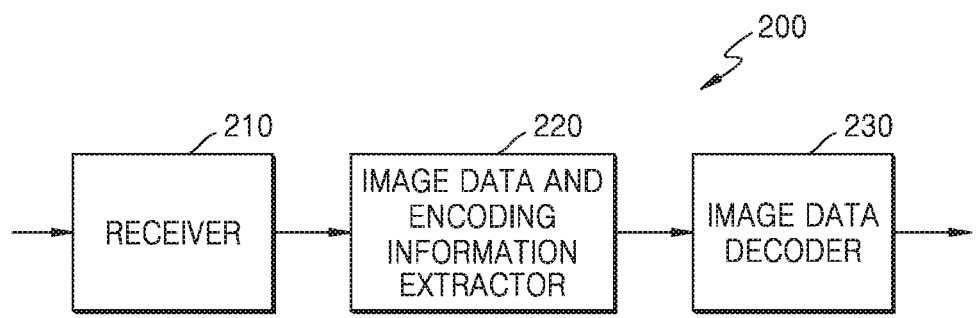
FIG. 8 is a block diagram of a video decoding apparatus based on coding units according to a tree structure, according to an embodiment.

FIG. 8 is a block diagram of a video decoding apparatus 200 based on coding units having a tree structure, according to an embodiment.

The video decoding apparatus 200 which will be described below is an embodiment of the interlayer video decoding apparatus 20 described above with reference to FIG. 2A. Thus, although not described here, the above description of the interlayer video decoding apparatus 20 may also apply to the video decoding apparatus 200.

The video decoding apparatus that involves video prediction based on coding units having a tree structure 200 according to an embodiment includes a receiver 210, an image data and encoding information extractor 220, and an image data decoder 230. For convenience of description, the video decoding apparatus that involves video prediction based on coding units having a tree structure 200 according to an embodiment will be abbreviated to the 'video decoding apparatus 200'.

Definitions of various terms, such as a coding unit, a depth, a prediction unit, a transformation unit, and various types of encoding mode information, for decoding operations of the video decoding apparatus 200 according to an embodiment are identical to those described with reference to FIG. 7 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a coded depth and encoding mode information for the coding units having a tree structure according to each largest coding unit, from the parsed bitstream. The extracted coded depth and encoding mode information are output to the image data decoder 230. That is, the image data in a bit stream is split into the largest coding unit so that the image data decoder 230 decodes the image data for each largest coding unit.

A coded depth and encoding mode information according to each largest coding unit may be set for at least one piece of coded depth information, and encoding mode information according to each coded depth may include partition type information about a corresponding coding unit, prediction-mode information, transformation unit size information, or the like. Also, split information according to depths may be extracted as coded depth information.

The coded depth and encoding mode information according to each largest coding unit extracted by the image data and encoding information extractor 220 are the coded depth and the encoding mode information determined to generate a minimum coding error when an encoder, such as the video encoding apparatus 100 according to an embodiment, repeatedly performs encoding for each deeper coding unit according to depths according to each largest coding unit. Accordingly, the video decoding apparatus 200 may reconstruct an image by decoding the image data according to a coding scheme that generates the minimum coding error.

Since encoding information about the coded depth and the encoding mode information may be assigned to a predetermined data unit from among a corresponding coding unit, a prediction unit, and a minimum unit, the image data and encoding information extractor 220 may extract the coded depth and the encoding mode information according to each predetermined data unit. If the coded depth and the encoding mode information of a corresponding largest coding unit is recorded according to each predetermined data unit, the predetermined data units to which the same coded depth and the encoding mode information are assigned may be inferred to be the data units included in the same largest coding unit.

The image data decoder 230 may reconstruct the current picture by decoding the image data in each largest coding unit based on the coded depth and the encoding mode information according to each largest coding unit. That is, the image data decoder 230 may decode the encoded image data based on the extracted information about the partition type, the prediction mode, and the transformation unit for each coding unit from among the coding units having the tree structure included in each largest coding unit. A decoding process may include a prediction including intra prediction and motion compensation, and an inverse transformation.

The image data decoder 230 may perform intra prediction or motion compensation according to a partition and a prediction mode of each coding unit, based on partition type information and prediction-mode information regarding about a prediction unit of a coding unit according to each depth.

In addition, the image data decoder 230 may read information about a transformation unit according to a tree structure for each coding unit so as to perform inverse transformation based on transformation units for each coding unit, for inverse transformation for each largest coding unit. Via the inverse transformation, a pixel value of a spatial domain of the coding unit may be reconstructed.

The image data decoder 230 may determine a coded depth of a current largest coding unit by using split information according to depths. If the split information indicates that image data is no longer split in the current depth, the current depth is the coded depth. Accordingly, the image data decoder 230 may decode encoded data in the current largest coding unit by using the partition type information about the prediction unit, the prediction-mode information, and the transformation unit size information.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Furthermore, the video decoding apparatus 200 of FIG. 8 may perform the operations of the video decoding apparatus 20 described above with reference to FIG. 2.

The receiver 210 may perform the operation of the parser 22 of the video decoding apparatus 20. The image data and encoding information extractor 220 and the image data decoder 230 may perform the operation of the intra-predictor 24 of the video decoding apparatus 20.

When prediction units for intra-prediction are determined in units of coding units having a tree structure, the parser 22 may parse an MPM flag from a bitstream to perform intra-prediction mode prediction for each of the prediction units. Current intra-mode information may be parsed from the bitstream after the parsing of the MPM flag without determining whether a left intra-prediction mode and an upper intra-prediction mode are the same or not. After parsing of symbols of blocks, including the MPM flag and the intra-mode information, is completed, the image data and encoding information extractor 220 may reconstruct current intra-prediction mode from parsed information. The current intra-prediction mode may be predicted using a fixed number of candidate intra-prediction modes. The image data decoder 230 may perform intra-prediction on a current prediction unit by using the reconstructed current intra-prediction mode and residual data.

The image data and encoding information extractor 220 may determine the number of candidate intra-prediction modes again for each of pictures.

The parser 22 may parse the information representing the fixed number of candidate intra-prediction modes from parameters of various data unit levels of the bitstream, such as a picture parameter set (PPS), a slice parameter set (SPS), a largest-coding-unit level, a coding-unit level, or a prediction-unit level. In this case, the image data and encoding information extractor 220 may determine the number of candidate intra-prediction modes, which is represented by the parsed information, for each of data units corresponding to the level at which the information is parsed.

However, even if the information representing the number of candidate intra-prediction modes is not parsed, the image data and encoding information extractor 220 may update the number of candidate intra-prediction modes for each of predetermined data units, e.g., each of slices, each of largest coding units, each of coding units, or each of prediction units.

Thus, the video decoding apparatus 200 may obtain information about at least one coding unit that generates the minimum coding error when encoding is recursively performed for each largest coding unit, and may use the information to decode the current picture. That is, the coding units having the tree structure determined to be the optimum coding units in each largest coding unit may be decoded.

Accordingly, even if image data has high resolution and a large amount of data, the image data may be efficiently decoded and reconstructed by using a size of a coding unit and an encoding mode, which are adaptively determined according to characteristics of the image data, by using optimum encoding mode information received from an encoder.

Figure 9:
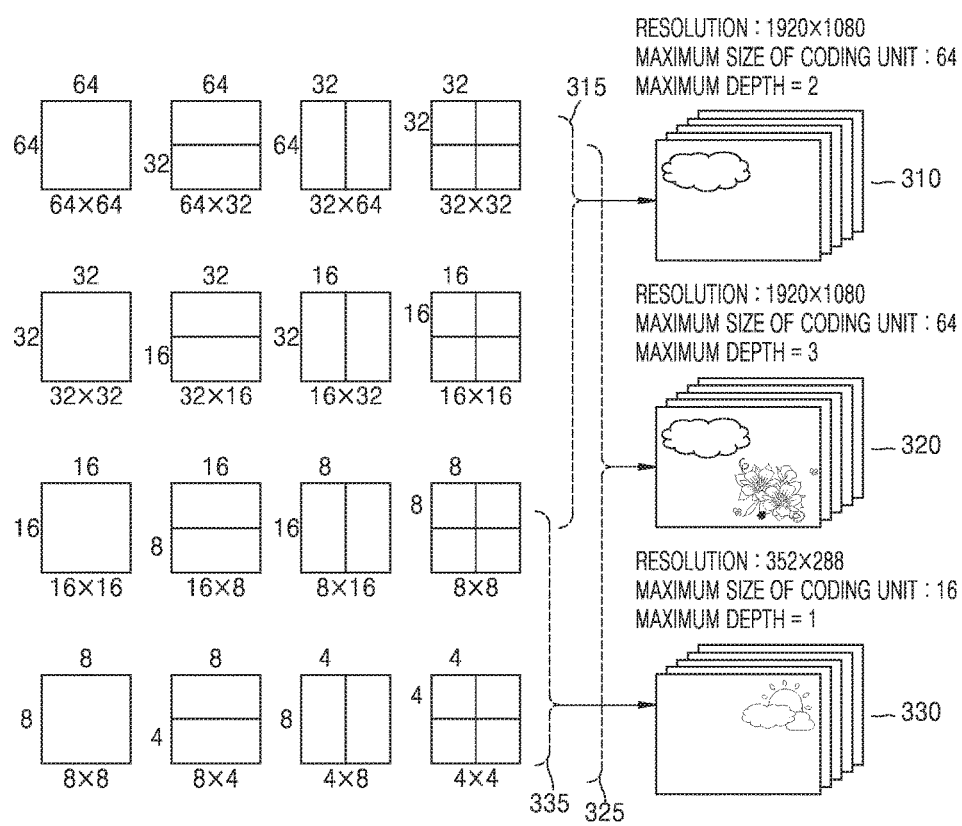
FIG. 9 is a diagram for describing a concept of coding units according to an embodiment of the present disclosure.

FIG. 9 is a diagram for describing a concept of coding units, according to an embodiment of the present disclosure.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 9 denotes a total number of splits from a largest coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. Since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 10:
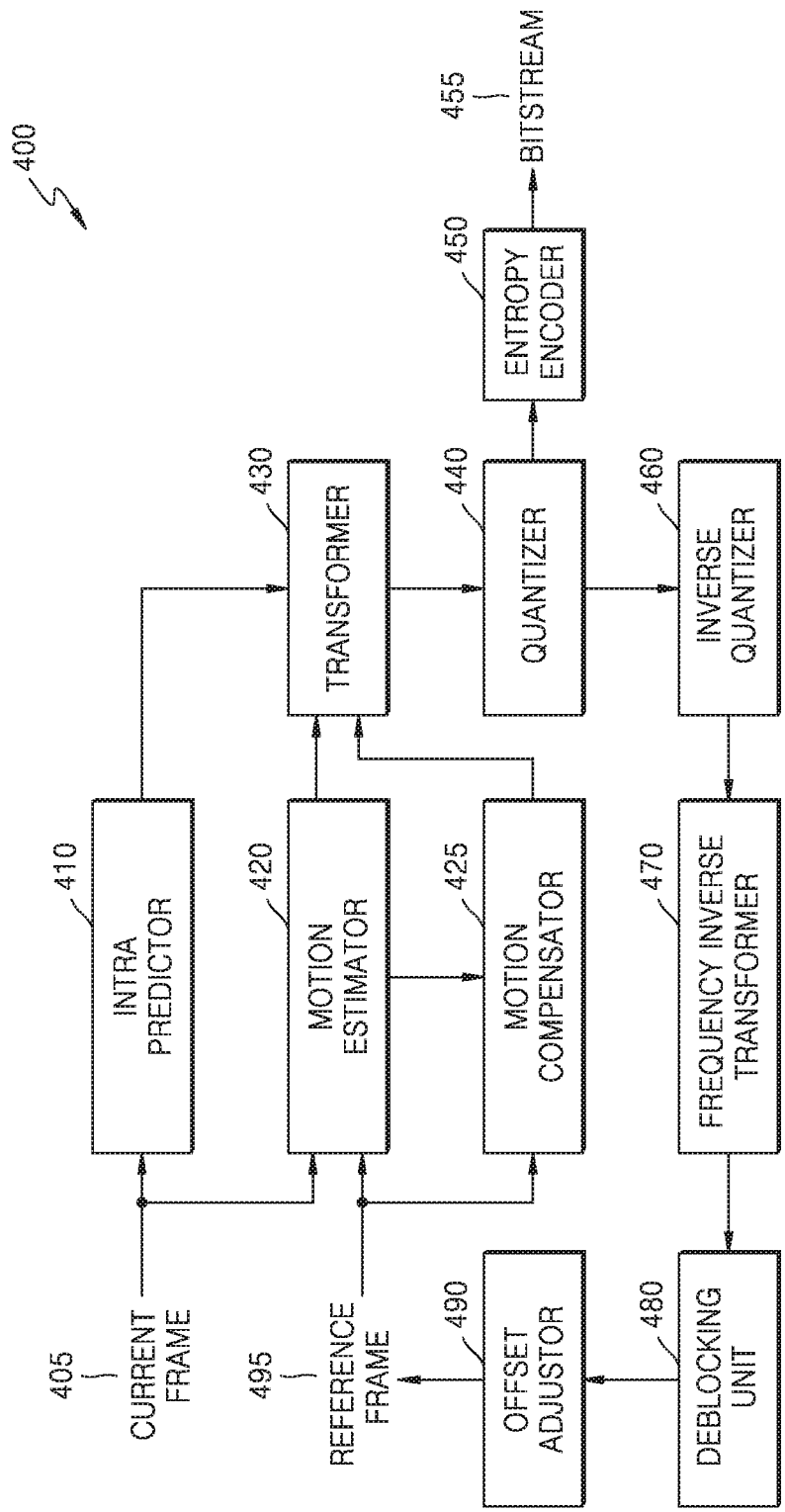
FIG. 10 is a block diagram of an image encoder based on coding units, according to an embodiment of the present disclosure.

FIG. 10 is a block diagram of an image encoder 400 based on coding units, according to an embodiment of the present disclosure.

The image encoder 400 according to an embodiment performs operations performed by the coding unit determiner 120 of the video encoding apparatus 100 to encode image data. That is, an intra-predictor 410 performs intra-prediction on intra-mode coding units of a current frame 405. A motion estimator 420 and a motion compensator 425 perform inter-estimation and motion compensation by using the current frame 405 and a reference frame 495 in an inter-mode.

Data output from the intra-predictor 410, the motion estimator 420, and the motion compensator 425 are input to a transformer 430 and a quantizer 440 and are then output as a quantized transformation coefficient. The quantized transformation coefficient is reconstructed to be spatial-domain data by an inverse quantizer 460 and an inverse transformer 470. The reconstructed spatial-domain data is post-processed by a deblocking unit 480 and a loop filtering unit 490 and is then output as the reference frame 495. The quantized transformation coefficient may be input to an entropy encoder 450 and be then output as a bitstream 455.

To be applied to the video encoding apparatus 100 according to an embodiment, all the intra-predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 which are elements of the image encoder 400 should each perform an operation based on each of coding units having a tree structure, for each of largest coding units in consideration of a maximum depth.

In particular, the intra-predictor 410, the motion estimator 420, and the motion compensator 425 may determine a partition and a prediction mode of each of the coding units having the tree structure by taking into account a maximum size and depth of a current largest coding unit, and the transformer 430 may determine the size of a transformation unit to be included in each of the coding units having the tree structure.

In particular, the intra-predictor 410 may perform an operation of the intra-predictor 12 of the video encoding apparatus 10. The intra-predictor 410 may determine prediction units for intra-prediction, which is to be performed on each of largest coding units, in units of the coding units having the tree structure, and perform intra-prediction on each of the prediction units.

A plurality of candidate intra-prediction modes are determined when a current prediction unit and a left/upper prediction unit are the same and a left intra-prediction mode and an upper intra-prediction mode are the same or different. Thus, the entropy encoder 450 may encode an MPM flag for each of the prediction units and thereafter current intra-mode information determined on the basis of candidate intra-prediction modes for the current prediction unit may be encoded.

Figure 11:
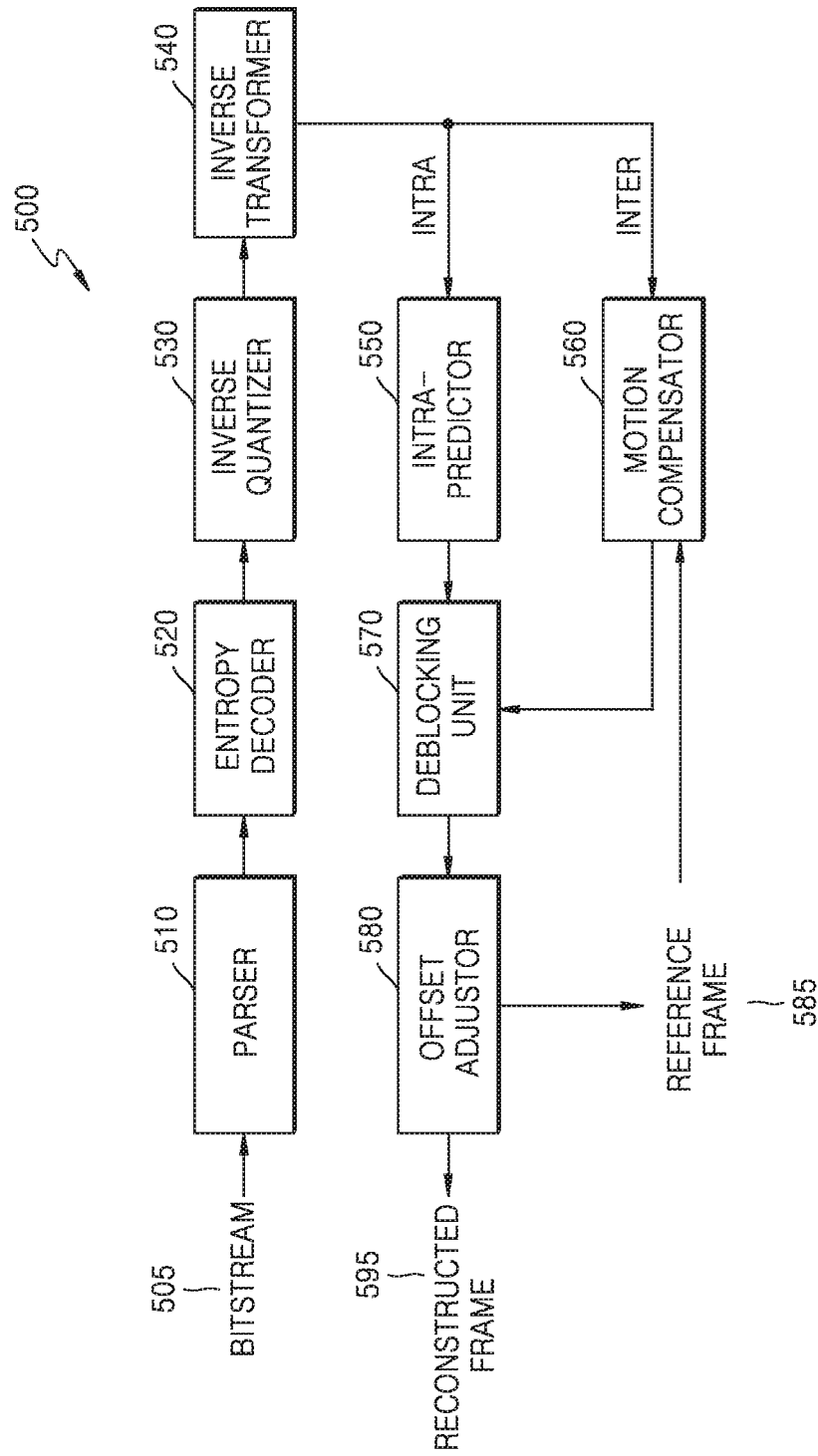
FIG. 11 is a block diagram of an image decoder based on coding units, according to an embodiment of the present disclosure.

FIG. 11 is a block diagram of an image decoder 500 based on coding units, according to an embodiment of the present disclosure.

When a bitstream 505 is input to a parser 510, encoded image data to be decoded and encoding information needed to perform decoding are parsed. As the encoded image data passes through an entropy decoder 520 and an inverse quantizer 530, inversely quantized data is output and is then reconstructed to spatial-domain image data via an inverse transformer 540.

An intra-predictor 550 performs intra-prediction on intra-mode coding units of the spatial-domain image data. A motion compensator 560 performs motion compensation on the intra-mode coding units by using a reference frame 585.

The spatial-domain image data passing through the intra-predictor 550 and the motion compensator 560 is post-processed by a deblocking unit 570 and a loop filtering unit 580 to output a reconstructed frame 595. Furthermore, as the spatial-domain image data is post-processed by the deblocking unit 570 and the loop filtering unit 580, a reference frame 585 may be output.

The operations of the image decoder 500 subsequent to the operation of the parser 510 according to an embodiment may be sequentially performed so that image data may be decoded by image data decoder 230 of the video decoding apparatus 200.

To be applied to the video decoding apparatus 200 according to an embodiment, all the parser 510, the entropy decoder 520, the inverse quantizer 530, the inverse transformer 540, the intra-predictor 550, the motion compensator 560, the deblocking unit 570, and the loop filtering unit 580 which are elements of the image decoder 500 may perform operations in units of largest coding units on the basis of coding units having a tree structure.

In particular, the intra-predictor 550 and the motion compensator 560 may determine partitions and a prediction mode of each of the coding units having the tree structure, and the inverse transformer 540 may determine the size of a transformation unit for each of the coding units.

In particular, when prediction units for intra-prediction are determined in units of the coding units having the tree structure, the parser 510 may parse an MPM flag from a bitstream for each of the prediction units to perform intra-prediction-mode prediction. Current intra-mode information may be parsed from the bitstream consecutively with the parsing of the MPM flag without determining whether a left intra-prediction mode and an upper intra-prediction mode are the same or not. After parsing symbols of blocks, including the MPM flag and the current intra-mode information, is completed, the entropy decoder 520 may reconstruct a current intra-prediction mode from the parsed information. The intra-predictor 550 may perform intra-prediction on a current prediction unit by using the reconstructed current intra-prediction mode and residual data.

Figure 12:
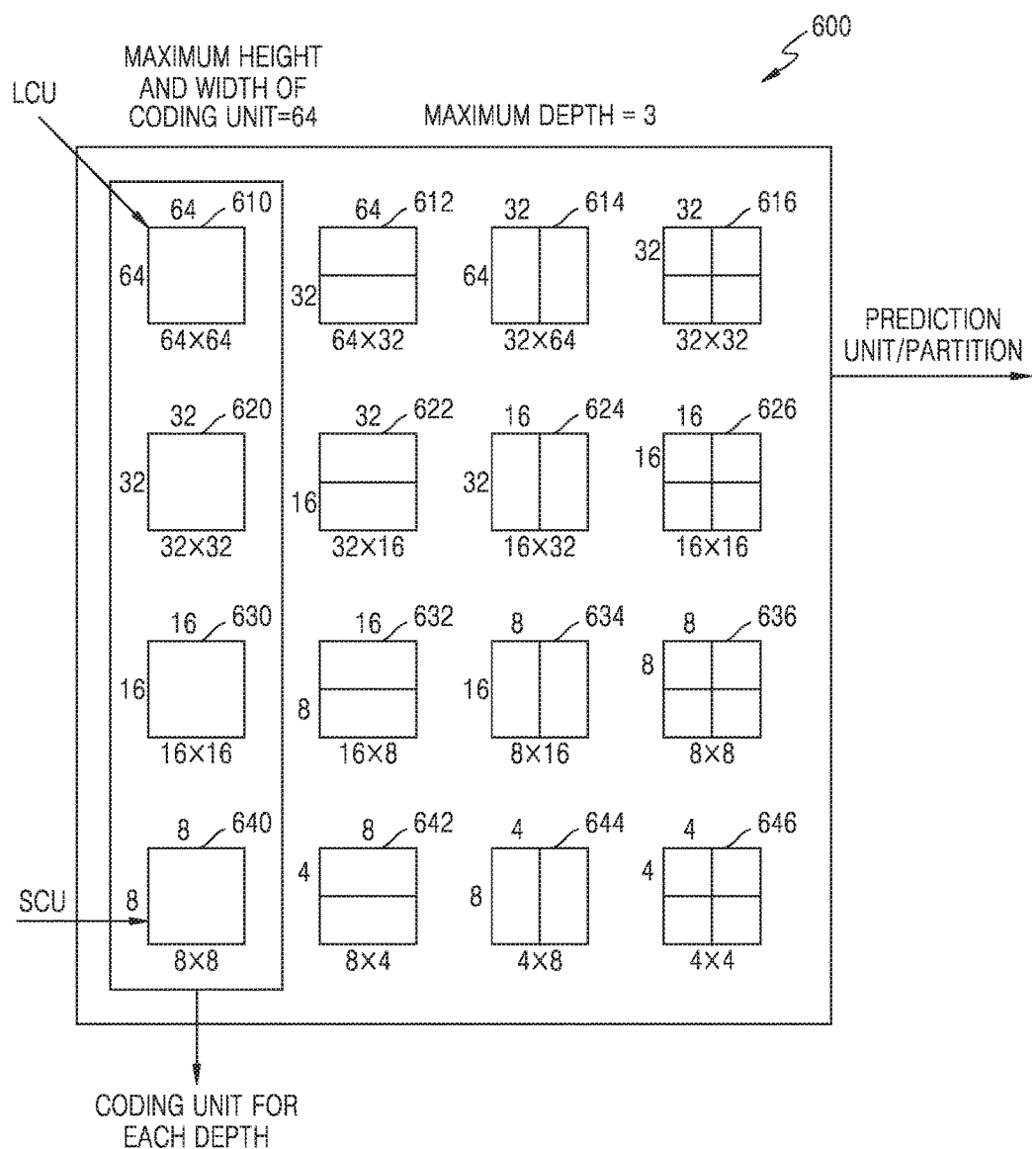
FIG. 12 illustrates coding units according to depths, and partitions, according to an embodiment of the present disclosure.

FIG. 12 illustrates coding units according to depths, and partitions, according to an embodiment of the present disclosure.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure 600 of coding units according to an embodiment, the maximum height and the maximum width of the coding units are each 64, and the maximum depth is 4. In this case, the maximum depth refers to a total number of times the coding unit is split from the largest coding unit to the minimum coding unit. Since a depth deepens along a vertical axis of the hierarchical structure 600 of coding units according to an embodiment, a height and a width of the deeper coding unit are each split. Also, a prediction unit and partitions, which are bases for prediction encoding of each deeper coding unit, are shown along a horizontal axis of the hierarchical structure 600.

That is, a coding unit 610 is a largest coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 650 having a size of 4×4 and a depth of 4 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions included in the encoding unit 610 having a size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having the size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having the size of 16×16, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having the size of 8×8, i.e. a partition having a size of 8×8 included in the coding unit 640, partitions 642 having a size of 8×4, partitions 644 having a size of 4×8, and partitions 646 having a size of 4×4.

Lastly, the coding unit 650 having the size of 4×4 and the depth of 4 may be a smallest coding unit having a lowest depth, and a prediction unit corresponding thereto may be set to only a partition 650 having a size of 4×4 and a depth of 4.

In order to determine the coded depth of the largest coding unit 610, the coding unit determiner 120 of the video encoding apparatus 100 according to an embodiment has to perform encoding on coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding according to depths, a representative encoding error that is a minimum coding error in a corresponding depth may be selected by performing encoding on prediction units of coding units according to depths, along the horizontal axis of the hierarchical structure 600 of the coding units. Alternatively, the minimum coding error may be searched for by comparing representative coding errors according to the depths, by performing encoding for each depth as the depth deepens along the vertical axis of the hierarchical structure 600 of the coding units. A depth and a partition having the minimum coding error in the largest coding unit 610 may be selected as a coded depth and a partition type of the largest coding unit 610.

Figure 13:
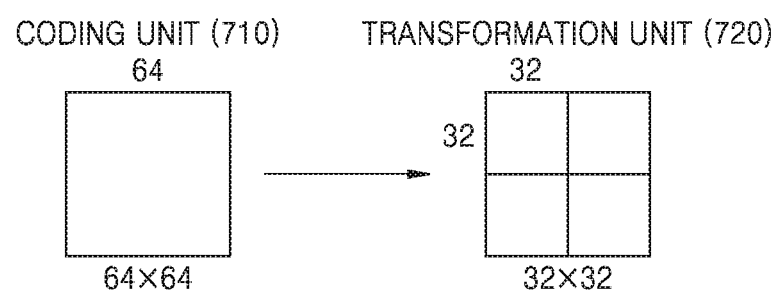
FIG. 13 illustrates a relationship between a coding unit and transformation units, according to an embodiment of the present disclosure.

FIG. 13 illustrates a relationship between a coding unit and transformation units, according to an embodiment of the present disclosure.

The video encoding apparatus 100 according to an embodiment or the video decoding apparatus 200 according to an embodiment encodes or decodes an image according to coding units having sizes less than or equal to a largest coding unit for each largest coding unit. Sizes of transformation units for transformation during encoding may be selected based on data units that are not larger than a corresponding coding unit.

For example, in the video encoding apparatus 100 according to an embodiment or the video decoding apparatus 200 according to an embodiment, if a size of a current coding unit 710 is 64×64, transformation may be performed by using a transformation unit 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having a minimum coding error may be selected.

FIG. 14 illustrates a plurality of pieces of encoding information according to depths, according to an embodiment.

The output unit 130 of the video encoding apparatus 100 according to an embodiment may encode and transmit partition type information 800, prediction-mode information 810, and transformation unit size information 820 for each coding unit corresponding to a coded depth, as encoding mode information.

The partition type information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition type information 800 about a partition type of a current coding unit is set to indicate one of the partition 804 having a size of 2N×N, the partition 806 having a size of N×2N, and the partition 808 having a size of N×N.

The prediction-mode information 810 indicates a prediction mode of each partition. For example, the prediction-mode information 810 may indicate a mode of prediction encoding performed on a partition indicated by the partition type information 800, i.e., an intra-mode 812, an inter mode 814, or a skip mode 816.

The transformation unit size information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 according to an embodiment may extract and use the partition type information 800, the prediction-mode information 810, and the transformation unit size information 820 for decoding, according to each deeper coding unit.

Figure 15:
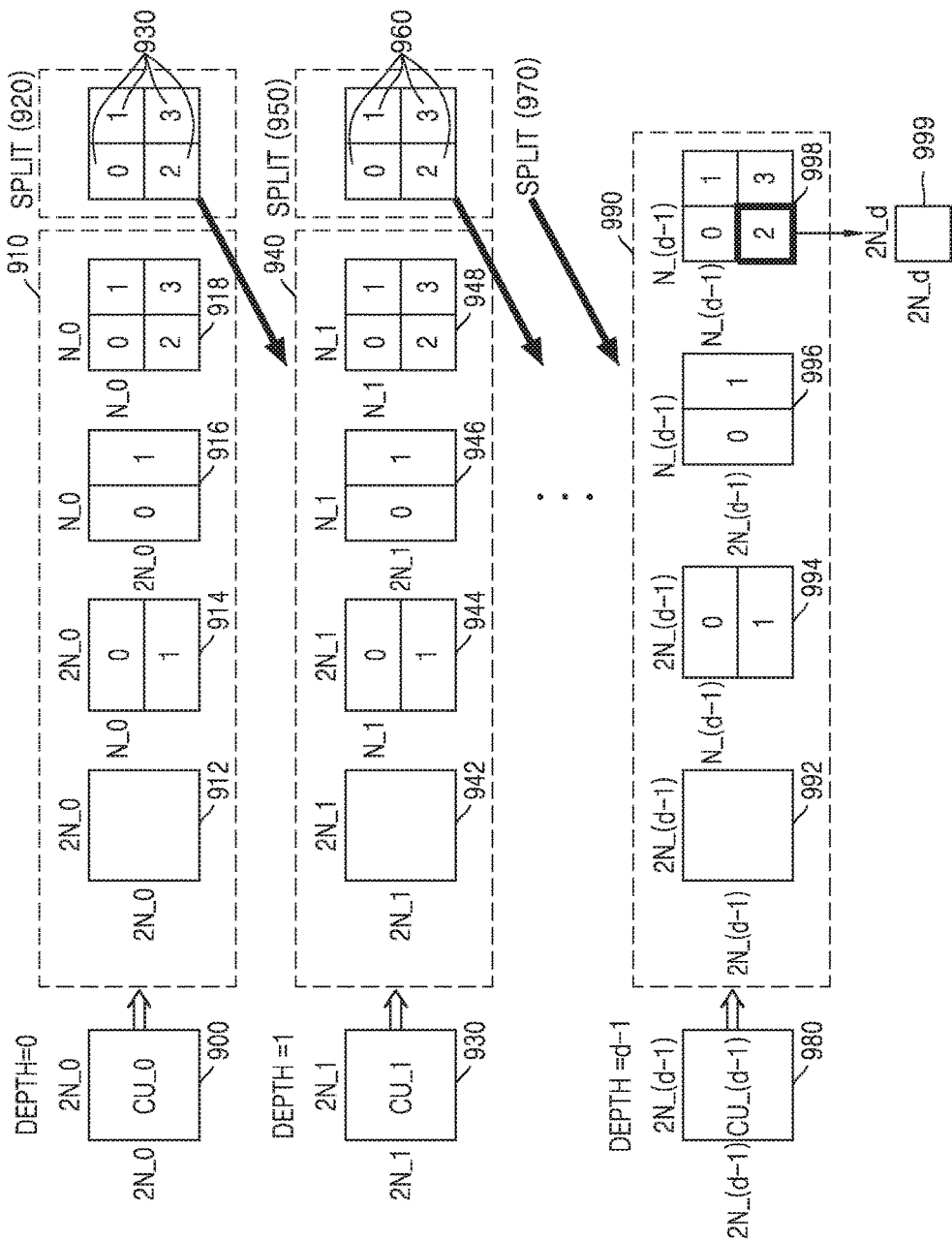
FIG. 15 illustrates coding units according to depths, according to an embodiment of the present disclosure.

FIG. 15 is a diagram of deeper coding units according to depths, according to an embodiment of the present disclosure.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 15 only illustrates the partitions 912, 914, 916, and 918 which are obtained by symmetrically splitting the prediction unit, but a partition type is not limited thereto, and may include asymmetrical partitions, partitions having a random shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra-mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error in one of the partition types 912, 914, and 916 is a least error, the prediction unit 910 may not be split into a lower depth.

If the encoding error in the partition type 918 is a minimum error, a depth is changed from 0 to 1 to split the partition type 918 in operation 920, and encoding is repeatedly performed on coding units 930 having a depth of 2 and a size of N_0×N_0 to search for a minimum coding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If the encoding error in the partition type 948 is a minimum error, a depth is changed from 1 to 2 to split the partition type 948 in operation 950, and encoding is repeatedly performed on coding units 960, which have a depth of 2 and a size of N_2×N_2 to search for a minimum coding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types to search for a partition type having a minimum coding error.

Even when the partition type 998 has the minimum coding error, since a maximum depth is d, a coding unit CU_(d−1) having a depth of d−1 is no longer split to a lower depth, and a coded depth for the coding units constituting a current largest coding unit 900 is determined to be d−1 and a partition type of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to an embodiment may be a square data unit obtained by splitting a minimum coding unit having a lowermost depth by 4. By performing the encoding repeatedly, the video encoding apparatus 100 according to an embodiment may select a depth having the minimum coding error by comparing encoding errors according to depths of the coding unit 900 so as to determine a coded depth, and may set a corresponding partition type and a prediction mode as an encoding mode of the coded depth.

As such, the minimum coding errors according to depths are compared in all of the depths of 0, 1, ..., d−1, d, and the depth having the minimum coding error may be determined as the coded depth. The coded depth, the partition type of the prediction unit, and the prediction mode may be encoded and transmitted as the encoding mode information. Also, since a coding unit is split from a depth of 0 to the coded depth, only split information of the coded depth is set to 0, and split information of depths excluding the coded depth is set to 1.

The image data and encoding information extractor 220 of the video decoding apparatus 200 according to an embodiment may extract and use the information about the coded depth and the prediction unit of the coding unit 900 so as to decode the coding unit 912. The video decoding apparatus 200 according to an embodiment may determine the depth, in which the split information is 0, as the coded depth by using the split information according to depths, and may use encoding mode information of the corresponding depth for decoding.

Figure 16:
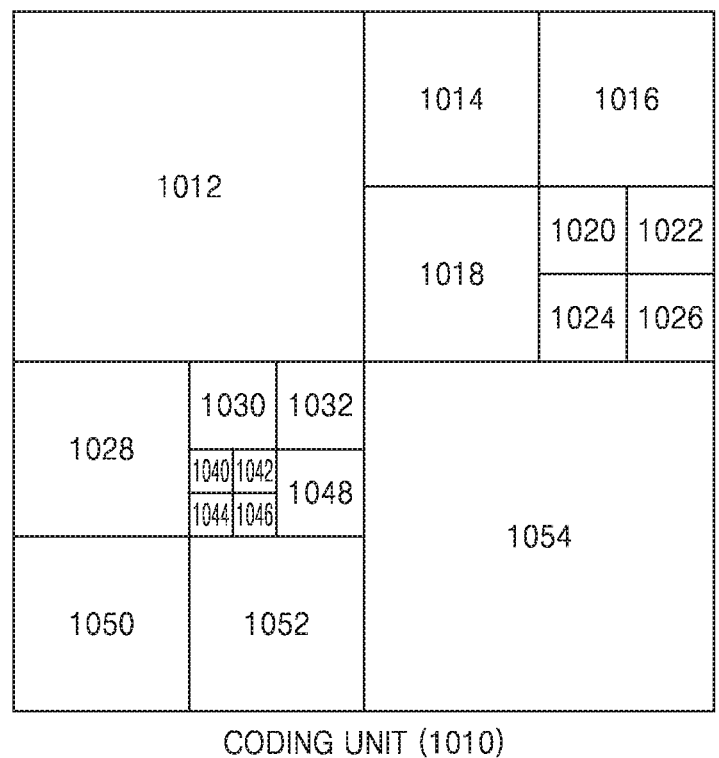
FIGS. 16, 17, and 18 illustrate a relationship between coding units, prediction units, and transformation units, according to an embodiment of the present disclosure.
Figure 17:
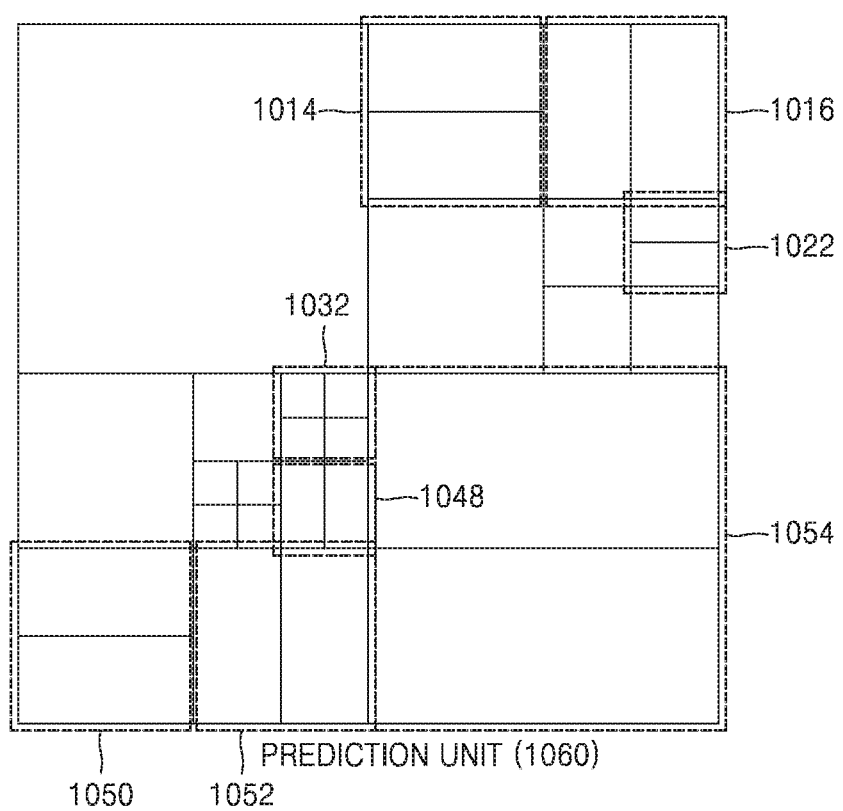
Figure 18:
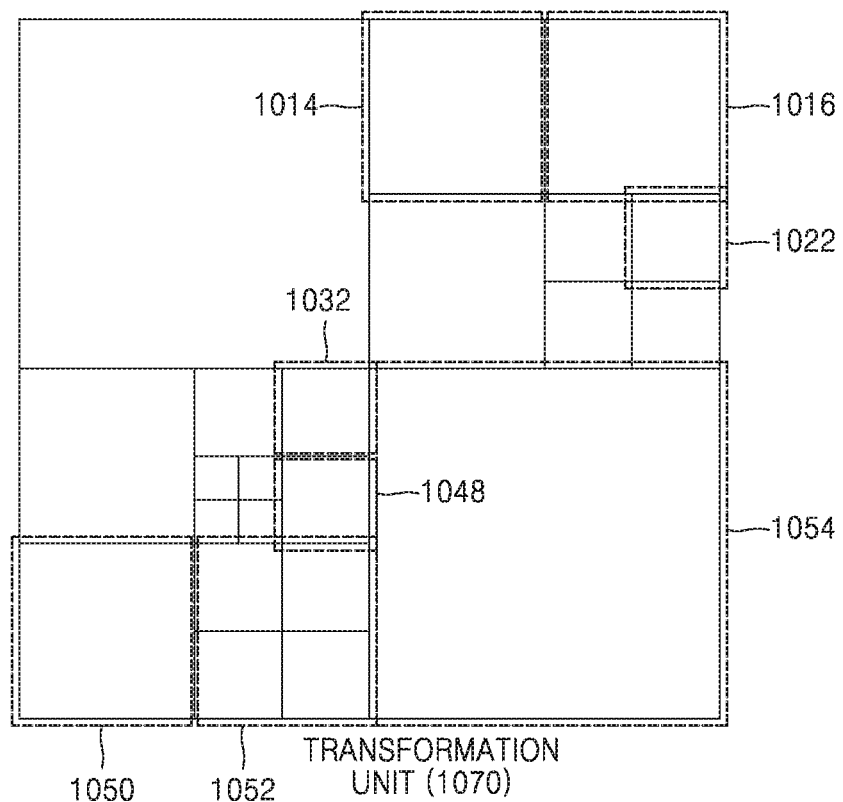

FIGS. 16, 17, and 18 illustrate a relationship between coding units, prediction units, and transformation units, according to an embodiment of the present disclosure.

Coding units 1010 are coding units according to coded depths determined by the video encoding apparatus 100 according to an embodiment, in a largest coding unit. Prediction units 1060 are partitions of prediction units of each of the coding units according to coded depths, and transformation units 1070 are transformation units of each of the coding units according to coded depths.

When a depth of a largest coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. That is, partition types in the coding units 1014, 1022, 1050, and 1054 have a size of 2N×N, partition types in the coding units 1016, 1048, and 1052 have a size of N×2N, and a partition types of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are data units different from those in the prediction units 1060 in terms of sizes and shapes. In other words, the video encoding and decoding apparatuses 100 and 200 according to an embodiment may perform intra prediction, motion estimation, motion compensation, transformation, and inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, partition type information, prediction-mode information, and transformation unit size information. Table 2 shows the encoding information that may be set by the video encoding and decoding apparatuses 100 and 200 according to embodiments.

width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

A size of a transformation unit may be set to be two types in the intra-mode and two types in the inter mode. That is, if split information of the transformation unit is 0, the size of the transformation unit may be 2N×2N, which is the size of the current coding unit. If the split information of the transformation unit is 1, the transformation units may be obtained by splitting the current coding unit. Also, if a partition type of the current coding unit having the size of 2N×2N is a symmetrical partition type, the size of the transformation unit may be N×N, and if the partition type of the current coding unit is an asymmetrical partition type, the size of the transformation unit may be N/2×N/2.

The encoding information about the coding units having a tree structure according to an embodiment may be allo-

TABLE 2

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Partition Type) N/2 × N/2 etc. (Asymmetrical Partition Type) | |

The output unit 130 of the video encoding apparatus 100 according to an embodiment may output the encoding information about the coding units having a tree structure, and the image data and encoding information extractor 220 of the video decoding apparatus 200 according to an embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus partition mode information, a prediction mode, and transformation unit size information may be defined for the coded depth. If the current coding unit is further split according to the split information, encoding is independently performed on four split coding units of a lower depth.

The prediction mode may be one of an intra-mode, an inter mode, and a skip mode. The intra-mode and the inter mode may be defined in all partition types, and the skip mode may be defined only in a partition type having a size of 2N×2N.

The partition mode information may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or cated to at least one of a coding unit corresponding to a coded depth, a prediction unit, and a minimum unit. The coding unit corresponding to the coded depth may include at least one of a prediction unit and a minimum unit that contain the same encoding information.

Accordingly, it is determined whether adjacent data units are included in the same coding unit corresponding to the coded depth by comparing encoding information of the adjacent data units. Also, a coding unit having to a corresponding coded depth may be determined by using encoding information of a data unit, and thus a distribution of coded depths in a largest coding unit may be inferred therefrom Accordingly, if a current coding unit is predicted by referring to adjacent data units, encoding information of data units in deeper coding units adjacent to the current coding unit may be directly referred to and used.

As another example, if the current coding unit is prediction-encoded by referring to an adjacent data unit, the adjacent data unit may be referred in a manner that a data unit that is adjacent to the current coding unit and is in a deeper coding unit is searched by using encoding information of the deeper coding unit.

Figure 19:
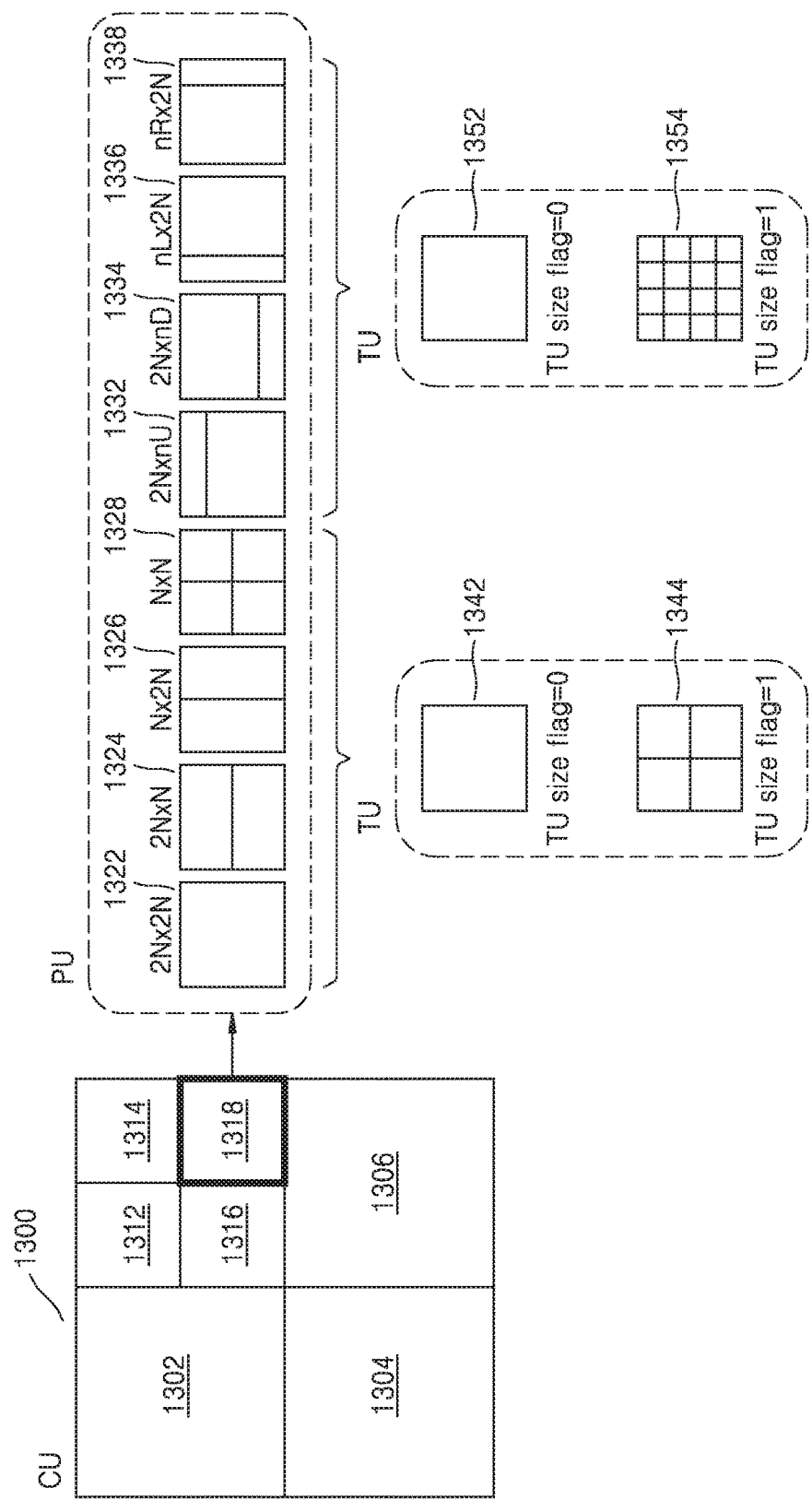
FIG. 19 illustrates a relationship between a coding unit, a prediction unit, and a transformation unit, according to encoding mode information of Table 1.

FIG. 19 is a diagram for describing a relationship between a coding unit, a prediction unit, and a transformation unit, according to encoding mode information of Table 1.

A largest coding unit 1300 includes coding units 1302, 1304, 1306, 1312, 1314, 1316, and 1318 of coded depths. Here, since the coding unit 1318 is a coding unit of a coded depth, split information may be set to 0. Partition type information of the coding unit 1318 having a size of 2N×2N may be set to be one of a partition type 1322 having a size of 2N×2N, a partition type 1324 having a size of 2N×N, a partition mode 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322 having a size of 2N×2N, the partition type 1324 having a size of 2N×N, the partition type 1326 having a size of N×2N, or the partition type 1328 having a size of N×N, a transformation unit 1342 having a size of 2N×2N may be set if the TU size flag of the transformation unit is 0, and a transformation unit 1344 having a size of N×N may be set if the TU size flag is 1.

When the partition type is set to be asymmetrical, i.e., the partition type 1332 having a size of 2N×nU, the partition mode 1334 having a size of 2N×nD, the partition mode 1336 having a size of nL×2N, or the partition mode 1338 having a size of nR×2N, a transformation unit 1352 having a size of 2N×2N may be set if the TU size flag is 0, and a transformation unit 1354 having a size of N/2×N/2 may be set if the TU size flag is 1.

Referring to FIG. 19, the TU size flag is a flag having a value or 0 or 1, but the TU size flag according to an embodiment is not limited to 1 bit, and the transformation unit may be hierarchically split while the TU size flag increases from 0. The split information (TU size flag) of the transformation unit may be used as an example of a transformation index.

In this case, a size of a transformation unit that has been actually used may be expressed by using the TU size flag of the transformation unit according to an embodiment, together with a maximum size and minimum size of the transformation unit. The video encoding apparatus 100 according to an embodiment may encode maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 100 according to an embodiment may decode video by using the maximum transformation unit size information, the minimum transformation unit size information, and the maximum TU size flag.

For example, (a) if a size of a current coding unit is 64×64 and a maximum transformation unit size is 32×32, (a-1) then a size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, since the size of the transformation unit cannot be less than 32×32, the TU size flag cannot be set to a value other than 0.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize}=\max(\text{MinTransformSize},\text{RootTuSize}/(2^{\wedge}\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize}=\min(\text{MaxTransformSize},\text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra-mode, 'RootTuSize' may be determined by using Equation (3) below. In Equation (3), 'PartitionSize' denotes the size of the current partition unit.

$$\text{RootTuSize}=\min(\text{MaxTransformSize},\text{PartitionSize}) \quad (3)$$

That is, if the current prediction mode is the intra-mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present disclosure is not limited thereto.

According to the video encoding method based on coding units having a tree structure as described with reference to FIGS. 7 through 19, image data of a spatial domain is encoded for each coding unit of a tree structure. According to the video decoding method based on coding units having a tree structure, decoding is performed for each largest coding unit to reconstruct image data of a spatial domain. Thus, a picture and a video that is a picture sequence may be reconstructed. The reconstructed video may be reproduced by a reproducing apparatus, stored in a storage medium, or transmitted through a network.

The embodiments according to the present disclosure may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the video encoding method and/or the video encoding method described above with reference to FIGS. 1A through 19 will be collectively referred to as a 'video encoding method of the present disclosure'. In addition, the inter-layer video decoding method and/or the video decoding method described above with reference to FIGS. 1A through 19 will be referred to as a 'video decoding method of the present disclosure'.

Also, a video encoding apparatus including the video encoding apparatus, the video encoding apparatus, or the video encoder, which has been described with reference to FIGS. 1A through 19, will be referred to as a 'video encoding apparatus of the present disclosure'. In addition, a video decoding apparatus including the inter-layer video decoding apparatus, the video decoding apparatus, or the video decoder, which has been descried with reference to FIGS. 1A through 19, will be referred to as a 'video decoding apparatus of the present disclosure'.

The computer-readable recording medium such as a disc 26000 that stores the programs according to an embodiment will now be described in detail.

Figure 20:
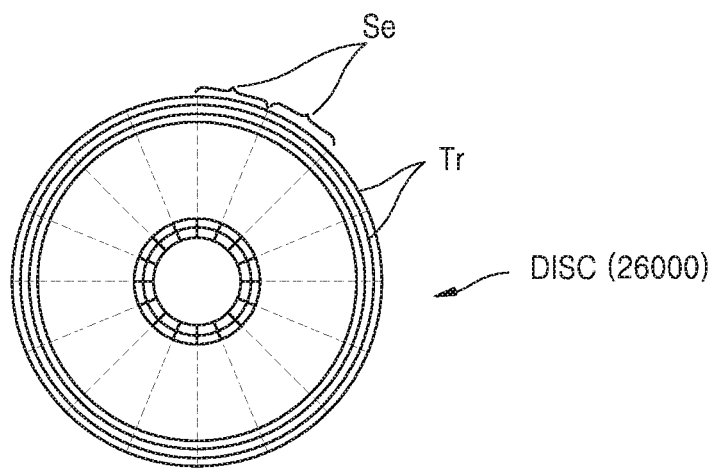
FIG. 20 is a diagram of a physical structure of a disc in which a program according to an embodiment is stored.

FIG. 20 is a diagram of a physical structure of the disc 26000 in which a program is stored, according to an embodiment. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000 according to an embodiment, a program that executes the quantization parameter determining method, the video encoding method, and the video decoding method described above may be assigned and stored.

A computer system embodied using the storage medium that stores the program for executing the video encoding method and the video decoding method as described above will now be described with reference to FIG. 21.

Figure 21:
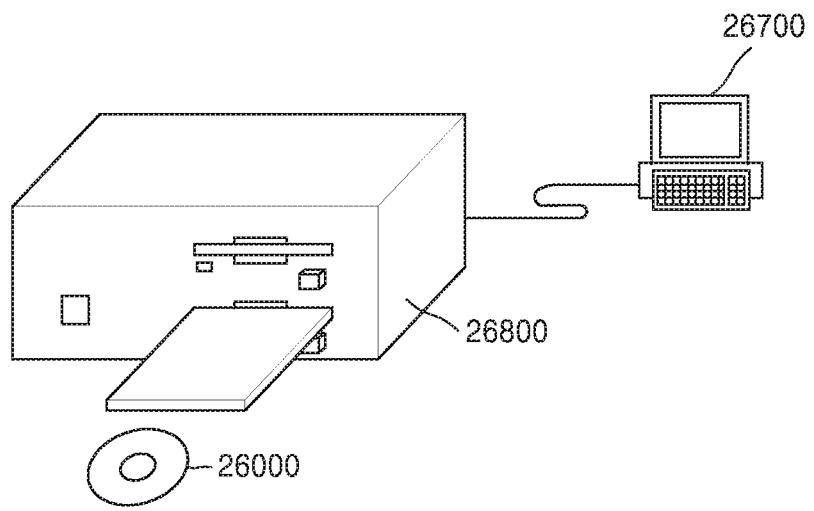
FIG. 21 is a diagram of a disc drive for recording and reading a program by using the disc.

FIG. 21 is a diagram of a disc drive 26800 for recording and reading a program by using the disc 26000. A computer system 27000 may store a program that executes at least one of a video encoding method and a video decoding method of the present disclosure, in the disc 26000 via the disc drive 26800. To run the program stored in the disc 26000 in the computer system 27000, the program may be read from the disc 26000 and be transmitted to the computer system 26700 by using the disc drive 27000.

The program that executes at least one of a video encoding method and a video decoding method of the present disclosure may be stored not only in the disc 26000 illustrated in FIGS. 20 and 21 but also in a memory card, a ROM cassette, or a solid state drive (SSD).

A system to which the video encoding method and a video decoding method described above are applied will be described below.

Figure 22:
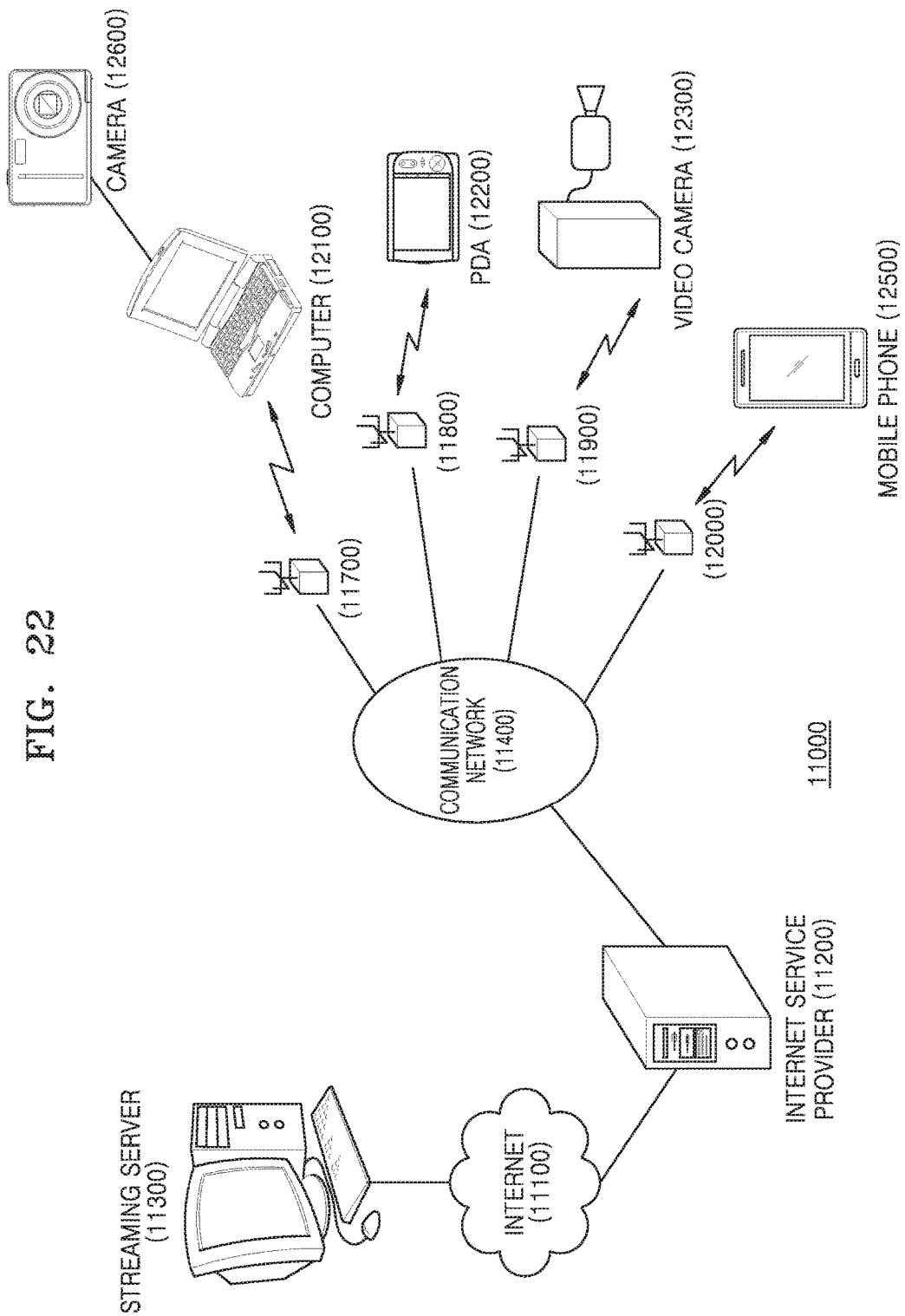
FIG. 22 is a diagram of an overall structure of a content supply system for providing a content distribution service.

FIG. 22 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 22, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

In the content supply system 11000 according to an embodiment, content data, e.g., content recorded during a concert, which has been recorded by a user using the video camera 12300, the camera 12600, the mobile phone 12500, or another imaging device is encoded and is transmitted to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real-time, thereby enabling personal broadcasting.

The video encoding apparatus and the video decoding apparatus of the present disclosure may be applied to encoding and decoding operations of the plurality of independent devices included in the content supply system 11000.

The mobile phone 12500 included in the content supply system 11000 according to an embodiment will now be described in greater detail with referring to FIGS. 23 and 24.

Figure 23:
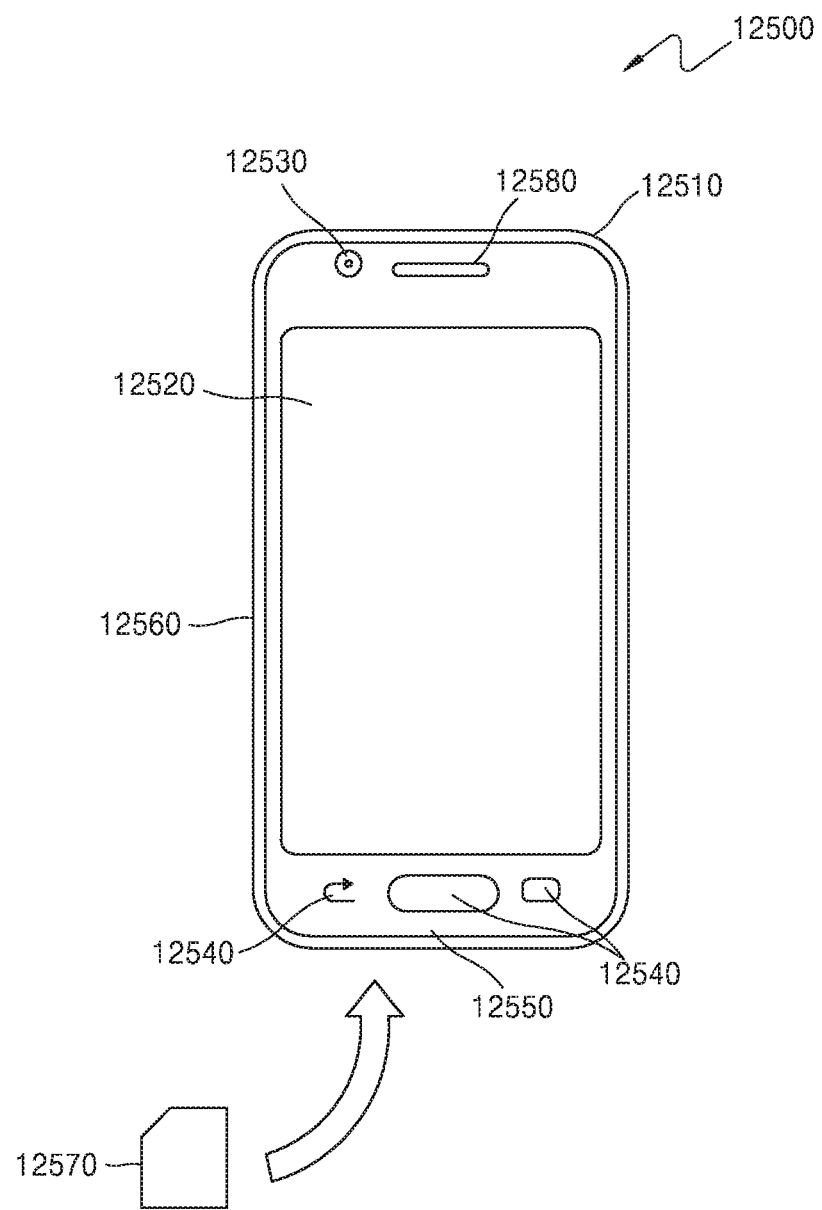
FIGS. 23 and 24 are diagrams respectively of an external structure and an internal structure of a mobile phone to which a video encoding method and a video decoding method of the present disclosure are applied, according to an embodiment.

FIG. 23 illustrates an external structure of the mobile phone 12500 to which the video encoding method and the video decoding method of the present disclosure are applied, according to an embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound output unit, and a microphone 12550 for inputting voice and sound or another type sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 24:
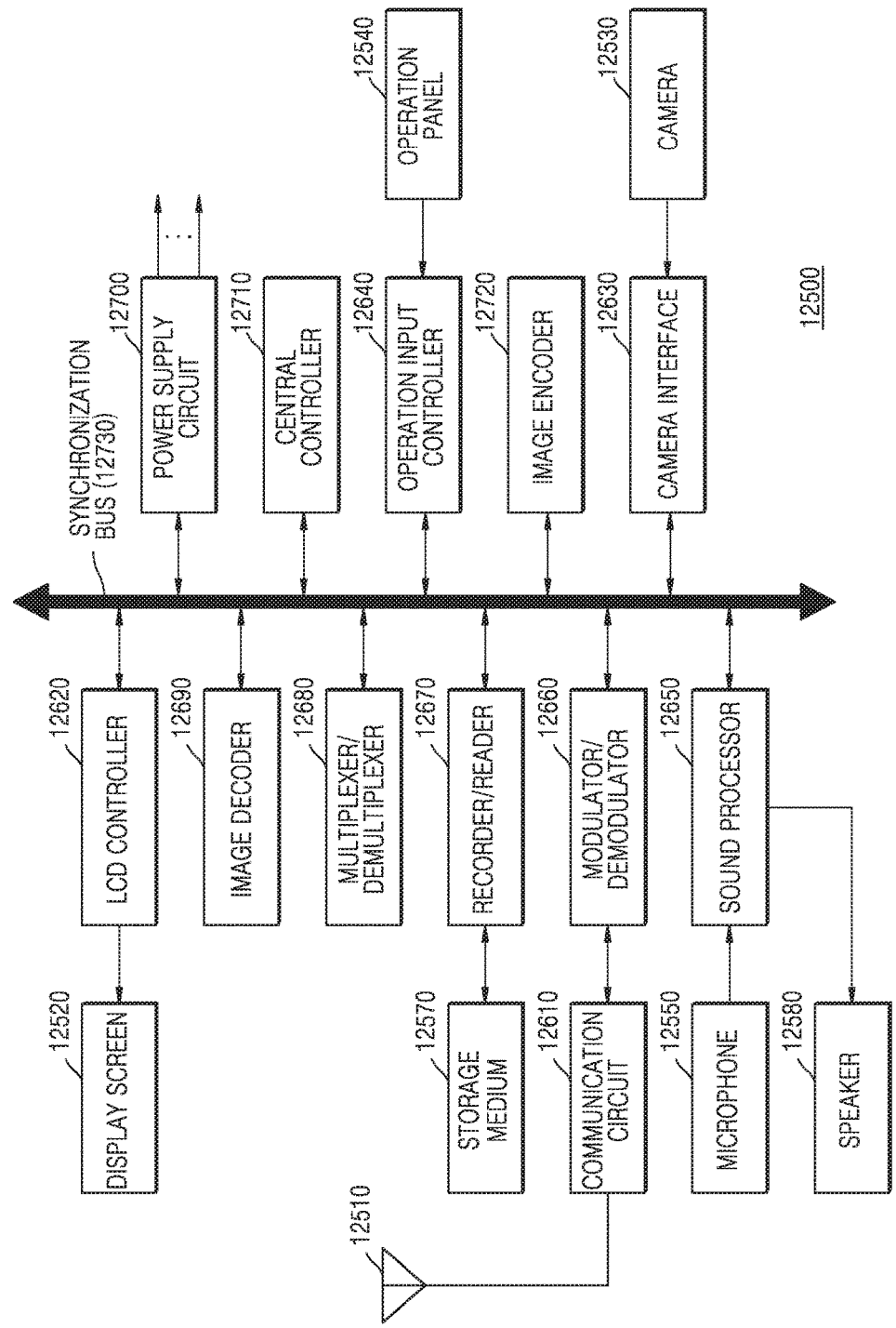

FIG. 24 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted into a digital sound signal by the sound processor 12650, under control of the central controller 12710. The digital sound signal may be converted into a transmission signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless base station 12000 via the antenna 12510.

In order to transmit image data in the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the video encoding method described above, and then may output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoding unit 12690 may correspond to that of the video decoding apparatus 200 described above. The image decoding unit 12690 may decode the encoded video data to obtain reconstructed video data and provide the reconstructed video data to the display screen 12520 via the LCD controller 12620, according to a video decoding method employed by the video decoding apparatus 200 or the image decoder 500 described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus of the present disclosure, may be a transceiving terminal including only the video encoding apparatus, or may be a transceiving terminal including only the video decoding apparatus.

A communication system according to the present disclosure is not limited to the communication system described above with reference to FIG. 24. For example, FIG. 25 illustrates a digital broadcasting system employing a communication system, according to an embodiment.

Figure 25:
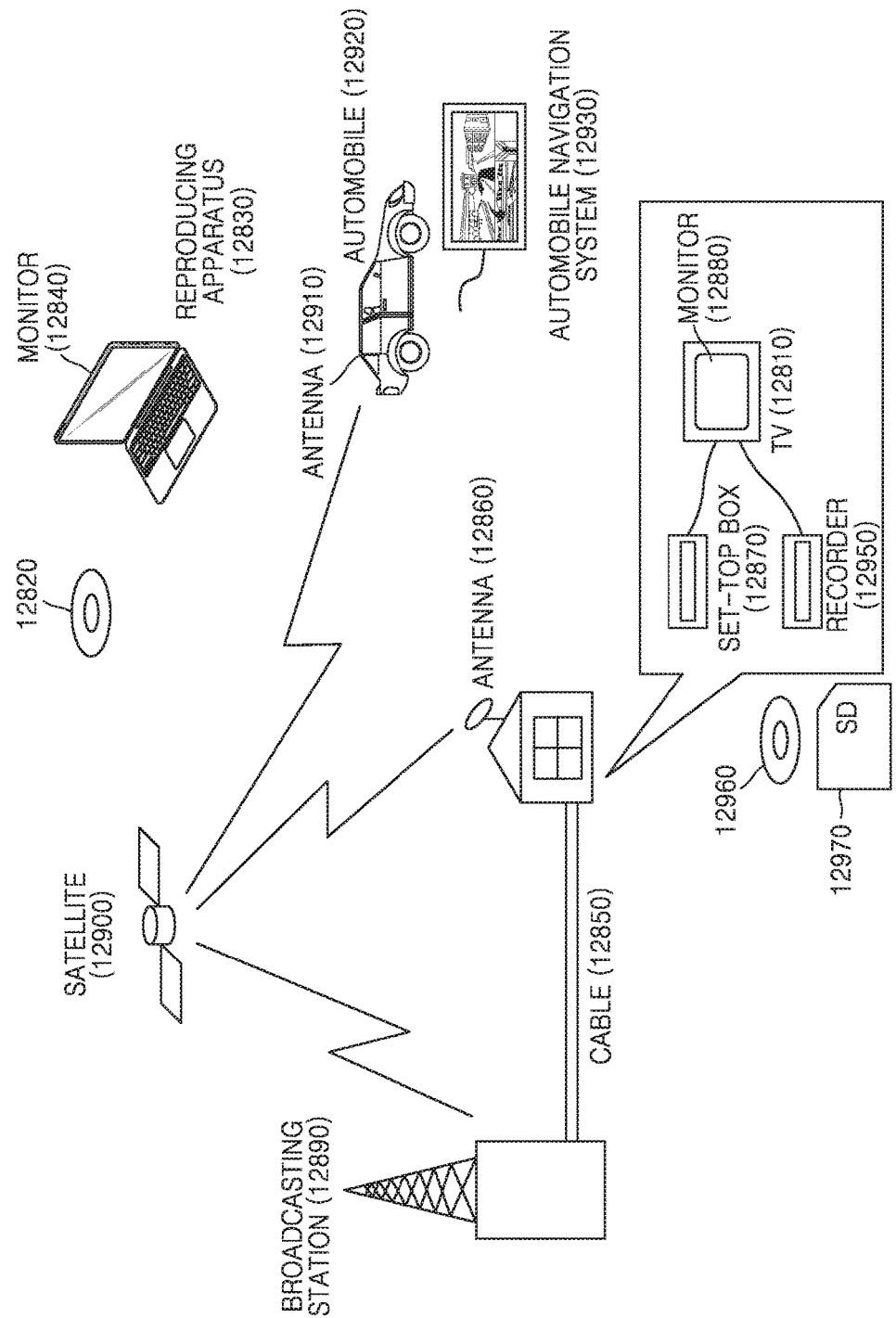
FIG. 25 is a diagram of a digital broadcasting system to which a communication system according to the present disclosure is applied.

The digital broadcasting system of FIG. 25 according to an embodiment may receive a digital broadcast transmitted via a satellite or a terrestrial network by using a video encoding apparatus and a video decoding apparatus of the present disclosure.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus of the present disclosure may be installed. Data output from the set-top box 12870 may also be reproduced on a TV monitor 12880.

As another example, a video decoding apparatus of the present disclosure may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by a video encoding apparatus of the present disclosure and may then be recorded to and stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus of the present disclosure, a video signal recorded on the DVD disc 12960, the SD card 12970, or another storage medium may be reproduced on the TV monitor 12880.

Figure 26:
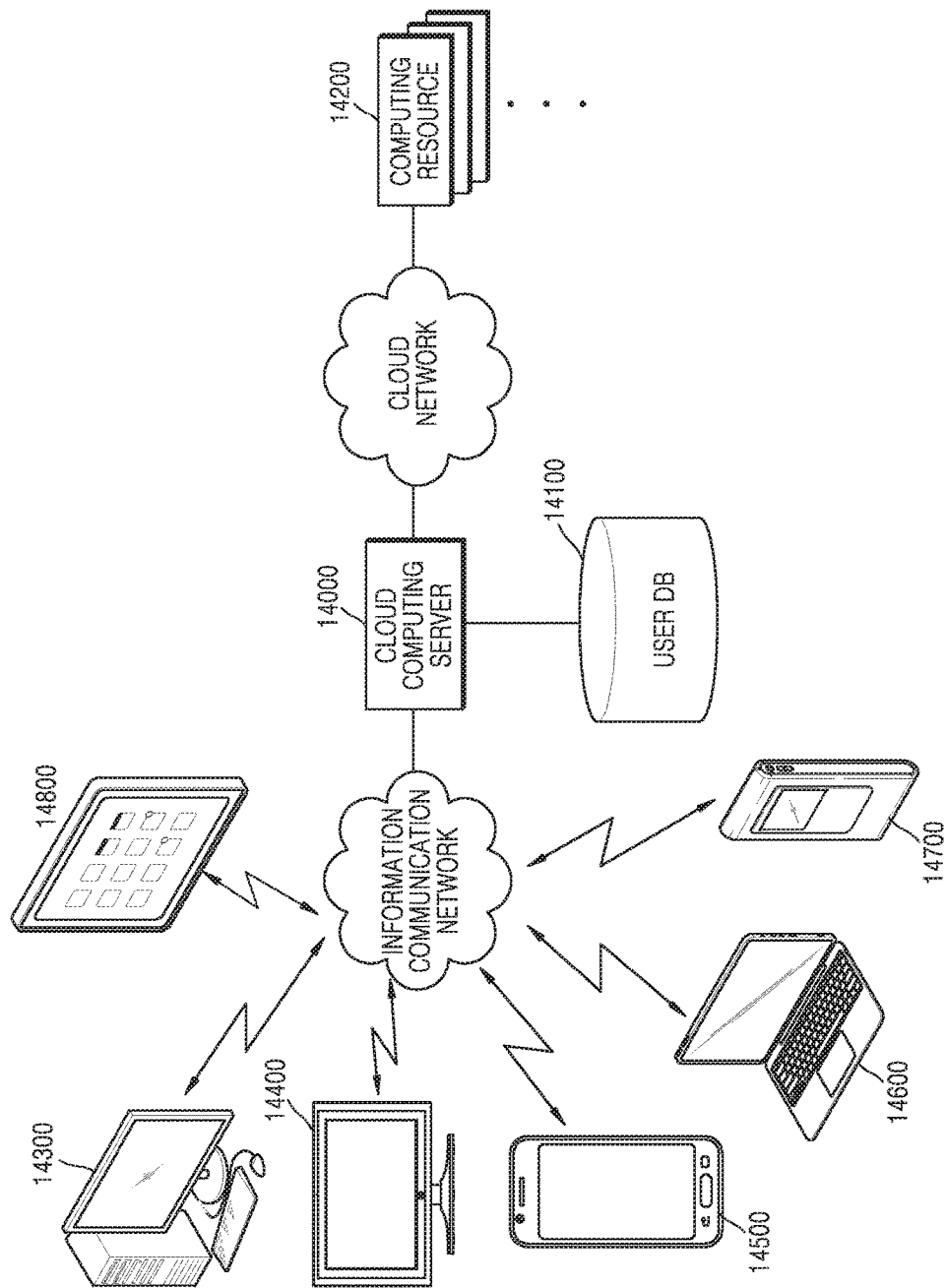
FIG. 26 illustrates a network structure of a cloud computing system using a video encoding apparatus and a video decoding apparatus according to an embodiment of the present disclosure.

The automobile navigation system 12930 may not include the camera 12530, the camera interface 12630, and the image encoder 12720 of FIG. 26. For example, the computer 12100 and the TV receiver 12810 may not include the camera 12530, the camera interface 12630, and the image encoder 12720 of FIG. 26.

FIG. 26 is a diagram illustrating a network structure of a cloud computing system using a video encoding apparatus and a video decoding apparatus, according to an embodiment.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus of the present disclosure as described above with reference to FIGS. 1A through 19. As another example, the user terminal may include a video encoding apparatus of the present disclosure as described above with reference to FIGS. 1A through 19. Alternatively, the user terminal may include both the video decoding apparatus and the video encoding apparatus of the present disclosure as described above with reference to FIGS. 1A through 19.

Various applications of a video encoding method, a video decoding method, a video encoding apparatus, and a video decoding apparatus according to embodiments described above with reference to FIGS. 1A through 19 have been described above with reference to FIGS. 20 through 26. However, methods of storing the video encoding method and the video decoding method in a storage medium or methods of implementing the video encoding apparatus and the video decoding apparatus in a device, according to embodiments, are not limited to the embodiments described above with reference to FIGS. 20 through 26.

Methods, processes, apparatuses, products and/or systems according to the present disclosure are simple, effective economically, not complicated, and very multi-purpose and accurate. Furthermore, when well-known elements are applied to the processes, apparatuses, products and systems according to the present disclosure, they may be directly used and efficiently and economically manufactured, applied, and used. Other important aspects of the present disclosure match the current trend pursuing after cost reduction, system simplification, and improved performance. Useful aspects of embodiments of the present disclosure will increase at least the level of current technology as a result.

Although exemplary embodiments of the present disclosure have been described above, it would be obvious to those of ordinary skill in the art that these embodiments are to cover all modifications, equivalents, and alternatives falling within the scope of the invention. That is, the appended claims should be understood as covering all modifications, equivalents, and alternatives falling within the scope of the invention. Therefore, all the matters described in the present disclosure and illustrated in the drawings should be understood merely as examples and should not be intended to restrict the scope of the invention.

The invention claimed is:

1. An interlayer video decoding method comprising:
obtaining prediction-mode information of a current block of a depth image from a bitstream;
generating a prediction block of the current block based on the prediction-mode information; and
decoding the depth image by using the prediction block, wherein the obtaining of the prediction-mode information of the current block from the bitstream comprises:
receiving a first flag, a second flag, and a third flag, wherein the first flag indicates whether prediction of the current block by dividing the current block into two or more partitions according to a pattern is permitted, the second flag indicates whether the depth image permits blocks of the depth image to be predicted by dividing the blocks into two or more partitions by using a wedgelet, and the third flag indicates whether the depth image permits the blocks of the depth image to be predicted by dividing the blocks into two or more partitions by using a contour; and
receiving a fourth flag from the bitstream when predetermined conditions determined based on the first to third flags are satisfied, wherein the fourth flag represents information regarding a type of a method of dividing the current block into two or more partitions according to the pattern.

2. The interlayer video decoding method of claim 1, wherein the second flag further indicates whether the depth image permits the blocks of the depth image to be predicted using an intra-simplified depth coding (SDC) mode.

3. The interlayer video decoding method of claim 1, wherein the fourth flag defines either a method of predicting the current block by dividing the current block into two or more partitions by using the wedgelet or a method of predicting the current block by dividing the current block into two or more partitions by using the contour.

4. The interlayer video decoding method of claim 1, wherein the third flag represents that the depth image does not permit a method of predicting the blocks of the depth image by dividing the blocks into two or more partitions by using the contour when the depth image does not permit texture images corresponding to the blocks of the depth image to be referred to.

5. The interlayer video decoding method of claim 1, wherein the obtaining of the prediction-mode information of the current block of the depth image comprises determining that the predetermined conditions are satisfied, when the first flag indicates that the method of predicting the current block by dividing the current block into two or more partitions according to the pattern is permitted, the second flag indicates that the depth image permits a method of predicting the blocks of the depth image by dividing the blocks into two or more partitions by using the wedgelet, and the third flag indicates that the depth image permits a method of predicting the blocks of the depth image by dividing the blocks into two or more partitions by using the contour.

6. The interlayer video decoding method of claim 1, wherein, during the obtaining of the prediction-mode information of the current block of the depth image, the current block is determined to be predicted by dividing the current block into two or more partitions by using the wedgelet, when the predetermined conditions are not satisfied, the second flag indicates that the depth image permits a method of predicting the blocks of the depth image by dividing the blocks into two or more partitions by using the wedgelet, and the third flag indicates that the depth image does not permit a method of predicting the blocks of the depth image by dividing the blocks into two or more partitions by using the contour; and is determined to be predicted by dividing the current block into two or more partitions by using the contour, when the predetermined conditions are not satisfied, the second flag indicates that the depth image does not permit the method of predicting the blocks of the depth image by dividing the blocks into two or more partitions by using the wedgelet, and the third flag indicates that the depth image permits the method of predicting the blocks of the depth image by dividing the blocks into two or more partitions by using the contour.

7. An interlayer video encoding method comprising:
determining a prediction mode of a current block of a depth image;
generating a prediction block of the current block by using the determined prediction mode; and
encoding the depth image by using the prediction block to generate a bitstream,
wherein the determining of the prediction mode of the current block comprises:
generating a first flag, a second flag, and a third flag, wherein the first flag indicates whether prediction of the current block by dividing the current block into two or more partitions according to a pattern is permitted, the second flag indicates whether the depth image permits blocks of the depth image to be predicted by dividing the blocks into two or more partitions by using a wedgelet, and the third flag indicates whether the depth image permits the blocks of the depth image to be predicted by dividing the blocks into two or more partitions by using a contour; and
generating a fourth flag when predetermined conditions determined based on the first flag, the second flag, and the third flag are satisfied, wherein the fourth flag represents information regarding a type of a method of dividing the current block into two or more partitions according to the pattern.

8. An interlayer video decoding apparatus comprising:
a prediction mode determiner configured to obtain prediction-mode information of a current block of a depth image from a bitstream;
a prediction block generator configured to generate a prediction block of the current block based on the prediction-mode information; and
a decoder configured to decode the depth image by using the prediction block,
wherein the prediction mode determiner receives a first flag, a second flag, and a third flag, and receives a fourth flag from the bitstream when predetermined conditions determined based on the first to third flags are satisfied,
wherein the first flag indicates whether prediction of the current block by dividing the current block into two or more partitions according to a pattern is permitted,
the second flag indicates whether the depth image permits blocks of the depth image to be predicted by dividing the blocks into two or more partitions by using a wedgelet,
the third flag indicates whether the depth image permits the blocks of the depth image to be predicted by dividing the blocks into two or more partitions by using a contour, and
the fourth flag represents information regarding a type of a method of dividing the current block into two or more partitions according to the pattern.

* * * * *